(12) United States Patent
Ryba et al.

(10) Patent No.: US 10,324,173 B2
(45) Date of Patent: Jun. 18, 2019

(54) ACOUSTIC TRANSDUCER ELEMENT

(71) Applicant: Airmar Technology Corporation, Milford, NH (US)

(72) Inventors: Nolen Ryba, Milford, NH (US); Kenneth D. Rolt, Westford, MA (US)

(73) Assignee: Airmar Technology Corporation, Milford, NH (US)

( * ) Notice: Subject to any disclaimer, the term of this patent is extended or adjusted under 35 U.S.C. 154(b) by 506 days.

(21) Appl. No.: 15/043,297

(22) Filed: Feb. 12, 2016

(65) Prior Publication Data

US 2016/0238699 A1 Aug. 18, 2016

Related U.S. Application Data

(60) Provisional application No. 62/116,029, filed on Feb. 13, 2015.

(51) Int. Cl.
*B06B 1/00* (2006.01)
*G01S 7/521* (2006.01)
(Continued)

(52) U.S. Cl.
CPC ............ *G01S 7/521* (2013.01); *B06B 1/0611* (2013.01); *B06B 1/0688* (2013.01);
(Continued)

(58) Field of Classification Search
CPC .. G10K 11/006; G10K 11/32; G01S 15/8902; B06B 1/0611; B06B 1/0688
See application file for complete search history.

(56) References Cited

U.S. PATENT DOCUMENTS 3,005,973 A 10/1961 Kietz
3,304,532 A 2/1967 Nelkin et al.
(Continued)

FOREIGN PATENT DOCUMENTS

WO WO 90/13367 A1 11/1990
WO WO 2012/038770 A1 3/2012
WO WO 2016/130996 A1 8/2016

OTHER PUBLICATIONS

Notification Concerning Transmittal of International Preliminary Report on Patentability for International Application No. PCT/US2016/017873, entitled: "Acoustic Transducer Element," dated Aug. 24, 2017.

(Continued)

*Primary Examiner* — Hovhannes Baghdasaryan
(74) *Attorney, Agent, or Firm* — Hamilton, Brook, Smith & Reynolds, P.C.

(57) ABSTRACT

In an embodiment, an acoustic transducer includes an element with an acoustic radiative surface having two warped edges at opposing sides. In another embodiment, an acoustic transducer includes first and second elements, each divided into at least two spatially separated portions electrically coupled to each other, the portions configured to interleave. In a further embodiment, an acoustic transducer includes first and second transducer elements. The second element is situated adjacent to the first element and includes a radiative surface with an edge having periodic elongations. In yet another embodiment, an acoustic transducer includes a transducer element with an acoustic radiative surface that has a skewed diamond shape.

19 Claims, 27 Drawing Sheets

(51) Int. Cl.
 B06B 1/06 (2006.01)
 G01S 15/89 (2006.01)
 G10K 11/32 (2006.01)
 G10K 11/00 (2006.01)
(52) U.S. Cl.
 CPC ........ *G01S 15/8902* (2013.01); *G10K 11/006* (2013.01); *G10K 11/32* (2013.01)

(56) References Cited

U.S. PATENT DOCUMENTS

| | | | |
|---|---|---|---|
| 3,618,007 | A | 11/1971 | Anderson |
| 4,197,591 | A | 4/1980 | Hagemann |
| 4,400,803 | A | 8/1983 | Spiess et al. |
| 4,928,915 | A | 5/1990 | Havins |
| 5,285,789 | A | 2/1994 | Chen et al. |
| 5,309,411 | A | 5/1994 | Huang et al. |
| 5,313,834 | A | 5/1994 | Lagace |
| 5,367,501 | A | 11/1994 | Kelly et al. |
| 5,389,848 | A | 2/1995 | Trzaskos |
| 5,530,683 | A | 6/1996 | Lindberg |
| 5,545,461 | A * | 8/1996 | Takeuchi ............ B41J 2/14233 156/89.11 |
| 5,808,970 | A | 9/1998 | Nussbaum et al. |
| 5,889,355 | A | 3/1999 | Shah |
| 6,046,961 | A | 4/2000 | Griffin et al. |
| 6,108,275 | A | 8/2000 | Hughes et al. |
| 6,130,641 | A | 10/2000 | Kraeutner et al. |
| 6,337,516 | B1 | 4/2002 | Whiteside et al. |
| 6,985,406 | B2 | 1/2006 | Billon |
| 7,652,952 | B2 | 1/2010 | Betts et al. |
| 7,710,825 | B2 | 5/2010 | Betts et al. |
| 7,729,203 | B2 | 6/2010 | Betts et al. |
| 7,755,974 | B2 | 7/2010 | Betts et al. |
| 8,300,499 | B2 | 10/2012 | Coleman et al. |
| 8,305,840 | B2 | 11/2012 | Maguire |
| 8,514,658 | B2 | 8/2013 | Maguire |
| 8,605,550 | B2 | 12/2013 | Maguire |
| 8,767,509 | B2 | 7/2014 | Freking et al. |
| 9,268,020 | B2 | 2/2016 | Coleman |
| 2004/0201326 | A1* | 10/2004 | Yokoi .................... H04R 17/00 310/348 |
| 2005/0105157 | A1* | 5/2005 | Yun .................... G02B 26/0808 359/572 |
| 2007/0035204 | A1 | 2/2007 | Angelsen et al. |
| 2010/0054084 | A1 | 3/2010 | Boucher et al. |
| 2013/0208568 | A1 | 8/2013 | Coleman |
| 2014/0064024 | A1 | 3/2014 | Maguire |
| 2014/0092709 | A1 | 4/2014 | Miller et al. |
| 2014/0334259 | A1* | 11/2014 | Tenghamn ............ G01V 1/133 367/21 |
| 2015/0253425 | A1 | 9/2015 | Coleman et al. |
| 2015/0312526 | A1 | 10/2015 | Coleman et al. |

OTHER PUBLICATIONS

Invitation to Pay Additional Fees with Partial International Search Annex for Int'l Application No. PCT/US2016/017873, titled: Acoustic Transducer Element, dated Apr. 21, 2016.
International Search Report and Written Opinion for Int'l Application No. PCT/US2016/017873, titled: Acoustic Transducer Element, dated Jun. 27, 2016.
"Apelco Fishfinder wins 1996 IMTEC Innovation Award; LCD Fishfinder with Optional "Sidelooker" Takes Top Honors in Electronics Category," 2 pages, Retrieved from http://findarticles.com/p/articles/mi_m0EIN/is_1996_Oct_8/ai/18756935 on Dec. 5, 2011 (Posted: Oct. 8, 1996).
"Joint Electronics Type Designation System," *Joint Electronics Type Designation System—Wikipedia, the free encyclopedia*, pp. 1-5 https://en.wikipedia.org/wiki/Joint_Electronics_Type_Designation_System [retrieved May 16, 2016].
"L470 Fishfinder Instruction Manual," Distributed by Raymarine, 103 pages, (No Date Given).
"L750 Fishfinder Operation Handbook," Distributed by Raymarine, 93 pages, (No Date Given).
"Phase Differencing Bathymetric Sonar", http://www.nauticalcharts.noaa.gov/csdl/PDBS.html 2 pages [retrieved on Sep. 30, 2014].
"Properties of Airmar Piezof LEXTM Piezoelectric Polymer," *Airmar Technology Corporation*, http://www.airmar.com, 6 pages (1999).
Andrews, D., EchoScan, Multibeam Echo Sounder, Odom Hydrographic Systems/STN Atlas Marine Electronics, 51 pages (No Date Given).
Avera, W., et al., "Multibeam Bathymetry from a Mine-Hunting Military Sonar," *Naval Research Laboratory and Steve Lungsch, Navel Oceanographic Office*, pp. 1-15 (No Date Given).
Bathymetry systems, Sea-floor Mapping Technology, Bathymetry, Sea-floor Mapping Technology, Bathymetry, http://woodshole.er.usgs.gov/operations/sfmapping/bathy.htm, 3 pages [Sep. 30, 2014].
Bird, J., "3D Sidescan Sonar," *Underwater Research Lab, Simon Fraser University*, 3 pages (No Date Given).
Brown, L.F., et al., "Introduction to the Special Issue on the 30th Anniversary of the Discovery of Piezoelectric PVDF," *IEEE Transactions on Ultrasonics, Ferroelectrics, and Frequency Control*, vol. 47, No. 6, pp. 1275-1276 (2000).
Capps, R.R. et al., "Handbook of Sonar Transducer Passive Materials," *NRL Memorandum Report 4311, Naval Research Laboratory*, 241 pages (1981).
Coda Octopus Introduction, UIS™ Product Overview, 11 pages (2013).
Coda Octopus/ROV and AUV, http://www.codaoctopus.com/sectors/rov-and-auv [retrieved May 16, 2016] 2 pages.
Coda Octopus: 3D Integrated Pan and Tilt Unit, 2 pages, Issue 2, published Jul. 2014.
Coda Octopus: 3D Ruggedized Protection Case, 1 page, Issue 1, published Feb. 2014.
CodaOctopus/Motion, Coda Products, http://www.codaoctopus.com, [retrieved May 16, 2016] 2 pages.
Day, Robert A., PBDF and Array Transducers, *NDTnet*, vol. 1, No. 09, 10 pages (Sep. 1996).
Echoscan Multibeam Echo Sounder, Odom Echoscan™, Echoscan General Specifications, http://www.odomhydrographic.com, 2 pages (No Date Given).
Echoscan Swath Manual, Revision 1.11, 44 pages (2002).
Edge, R.H., "Handling and Towing the Long Range Side Scan Sonar Vehicle "Gloria" on R.R.S. "Discovery"," *Institute of Oceanographic Science*, vol. 1, 307, 9 pages (No Date Given).
Fessenden Fathometer Amplifier—Submarine Signal Company, Submarine Signal Company, *The Subchaser Archives*, 6 pages, http://www.subchaser.org/fathometer, retrieved May 17, 2016.
Garello, R. et al., "Radar and Sonar Interferometry," *Acoustics, Paris, SFA Euronoise*, 6 pages (2008).
GeoAcoustics, "Swath Bathymetry 1: Geoswath Plus Technology and Data Examples," *Kongsberg*, 58 pages (2009).
Gostnell, C., "Efficacy of an Interferometric Sonar for Hydrographic Surveying: Do Interferometers Warrant an in depth Examination?," *Office of Coast Survey, Hydrographic Surveys Division*, pp. 1-35 (No Date Given).
Hammerstad, E. et al., "Ultra Wide Swath Deep Sea Interferometric Multibeam Echo Sounder with Sea Bottom Imaging System," *Ifremer, Actes de Colloques*, No. 12, 9 pages (1991).
Harris, F.J., "On the Use of Windows for Harmonic Analysis with the Discrete Fourier Transform," *IEEE*, vol. 66, pp. 51-83 (1978).
Hiller, T., "Solving the Interferometric Processing Bottleneck," Thurne Hydrographic Ltd., 3 pages (No Date Given).
Innovative Marine Technology, Knudsen Engineering Limited—Pinger SBP Update, 2 pages, Retrieved from https://knudseneng.com/archives/pinger_sbp_update.html on Sep. 6, 2016 (Posted: 2014).
Interferometric Sidescans/Overview, http://www.oceanicimaging.com/interferometric.html , 2 pages (Sep. 30, 2014).
Knudsen Pinger Project, Unique Characteristics, 1 page (No Date Given).
Knudsen Pinger SBP Press Release Sea Tech, "Knudsen Engineering Tests Pinger SBP System in Vermont," www.sea-technology.com, p. 65 (2011).

(56) References Cited

OTHER PUBLICATIONS

L3 Klein Associates, Inc., Side Scan Sonar, http://www.1-3mps.com/klein/sidescansonar.aspx 4 pages, [retrieved on Sep. 30, 2014].
Lan, J. et al., "Investigation of Broadband Characteristics of PVDF Ultrasonic Transducers by Finite Element Modeling and Experiments," *IEEE Ultrasonics Symposium*, pp. 1109-1112, (1999).
Lathrop, J.D., "High area rate reconnaissance (HARR) and mine reconnaissance/hunter (MR/H) exploratory development programs," *SPIE*, vol. 2496, pp. 350-356 (No Date Given).
Llort-Pujol, G., "Advanced interferometric techniques for high resolution bathymetry," *Author manuscript, published in Journal of Marine Technology Society Journal 46*, 2, pp. 1-27 (2012).
Lurton, X., "Swath Bathymetry Using Phase Difference: Theoretical Analysis of Acoustical Measurement Precision," *IEEE Journal of Oceanic Engineering*, vol. 25, No. 3, pp. 351-363 (2000).
Malkin, Marc., "Increasing Your Catch With a State-Of-The-Art Fishfinder," *BoatersWorld.com.*, http://www.boatersworld.com/static/bwarticles/product/fish-finder.hmtl, 3 pages, (No date given).
Marine Electronics Ltd., WideView 3D Side Scan Sonar, 2 pages (2012).
Meyer, J.E. et al., "Distributed and Discrete Transducer Spatial Design for Finite-Element-Modeled Flexible Structures," SPIE Proceedings, 2190: 369-380 (Feb. 1994).
Model 5500, 3D Side Scan Bathy Sonar, Sonar Technology, www.marine-electronics.co.uk, 2 pages (No Date Given).
OzCoasts Habitat Mapping: Side Scan Sonar, Side Scan Sonar—Brief Description, http://www.ozcoasts.gov.au/geom_geol/toolkit/Tech_CA_sss.jsp#item7[ retrieved on Sep. 30, 2014].
Pangeosubsea, The Acoustic Corer™, Overview Acoustic Corer—PanGeo Subsea, 3 pages, Retrieved from http://www.pangeosubsea.com/pangeo-acoustic-corer on May 16, 2016.
Pangeosubsea, The Sub-Bottom Imager™, Overview Sub-Bottom Imager—PanGeo Subsea, 3 pages, Retrieved from http://www.pangeosubsea.com/pangeo-sub-bottom-imager, on May 16, 2016.
Piezoflex™ Polymer Transducers, "Innovative Piezoelectric Polymer Material Exclusively From Aimar," www.airmar.com, *Airmar Technology Corporation, PVDF 4p Brochure_rB*, 4 pages (2014).
Reynhout, D. H., "Subsig: Odyssey of an Organization," *The Final Act*, p. 149 (No Date Given).
Rolt, K., "Side Looker Transducer a Recreational Marine Side Scan Sonar Transducer from 1996", *Airman Technology Corp.*, Dec. 2011, 16 pages.
Rossing, T., "Sonofusion??," *The Acoustical Society of America, Echoes*, vol. 12, No. 2, 8 pages (2002).
Rougeau, A. et al., "Adaptation of new transducer materials in the design of abathymetric multi-beam system," *Brows Conference Publications, Oceans MTS/IEEE Challen*, 1 page (1995).
Rusby, J. S. M. et al., "An Experimental Survey of a Herring Fishery by Long-Range Sonar," *Marine Biology 22*, pp. 271-292 (1973).
Sæbø, T. O., "Seafloor Depth Estimation by means of Interferometric Synthetic Aperture Sonar," *University of Tromsø UIT, Faculty of Science and Technology Department of Physics and Technology*, 202 pages (2010).
SARA/CAATI Sonar Technology, 3D Imaging Sonar, http://www2.ensc.sfu.ca/research/url/sonar/SARAS.html, 3 pages [ retrieved on Sep. 30, 2014].
Side Looker PZT PVDF Assembly from 1996, 1 page.
Sintes, C., "Interferometric Side Scan Sonar: A Tool for High Resolution Sea Floor Exploration," *Topic 6: Monitoring and R&D Programmes After a* Pollution, 15 pages (2002).
Tancrell, R. H. et al., "Properties of PVDF Polymer for Sonar," *IEEE Ultrasonics Symposium*, pp. 624-629 (1985).
Tancrell, R. H. et al., "PVDF Piezoelectric Polymer: Processing Properties and Hydrophone Applications," *Transducers for Sonics and* Ultrasonics, *Chapter 8, Proceedings of the Third International Workshop*, pp. 103-112 (1993).
Airmar Illustration 91-252 Apelco, Raytheon Sidelooker® Transducer; 1 page (Published prior to 2015).
Apelco Fishfinder 265, 365, 465; retrieved from the Internet URL: http://web.tiscalinet.it/teletronics/catalogo_nautica/fishfind.htm [retrieved Apr. 6, 2017].
"Apelco Fishfinder 465 Instruction Manual"; Distributed by Raymarine; 107 pages (Published prior to 2015).
"Apelco Sidelooker Transducer Installation Guide"; Distributed by Raymarine; 2 pages (Published prior to 2015).
EBay Listing No. 190815145215; "New Raytheon Side Looker Transducer—M78929—Raymarine—Sidelooker"; retrieved from the Internet URL: http://www.ebay.com/itm/NEW-Raytheon-Side-Looker-Transducer-M78929-Raymarine-Sidelooker-/190815145215?hash=item2c6d780cff&vxp=mtr [retrieved Apr. 24, 2017].
"Raymarine FishFinder L265 Instruction Manual"; Distributed by Raymarine;78 pages (Published prior to 2015).
Raymarine Technical Support Community; retrieved from the Internet URL: http://raymarine.ning.com/forum/topics/apelco-365-fish-finder?commentId=6492755%3AComment%3A39566&xg_source=activity [retrieved Apr. 6, 2017].

* cited by examiner

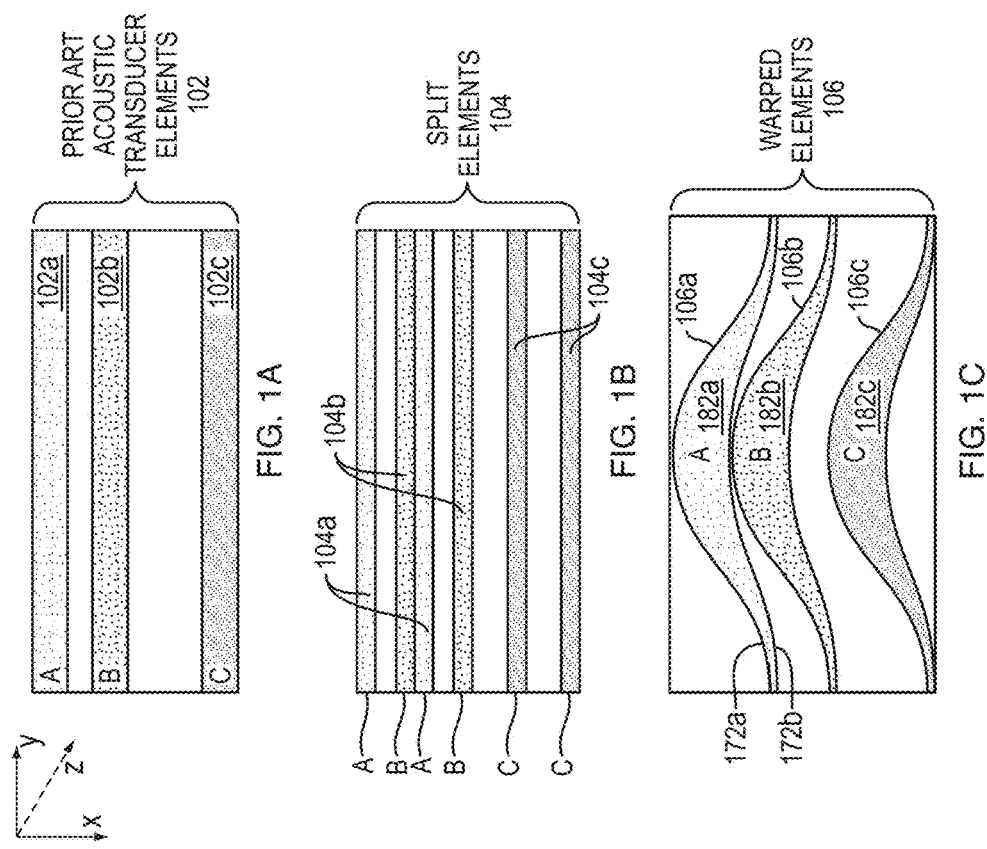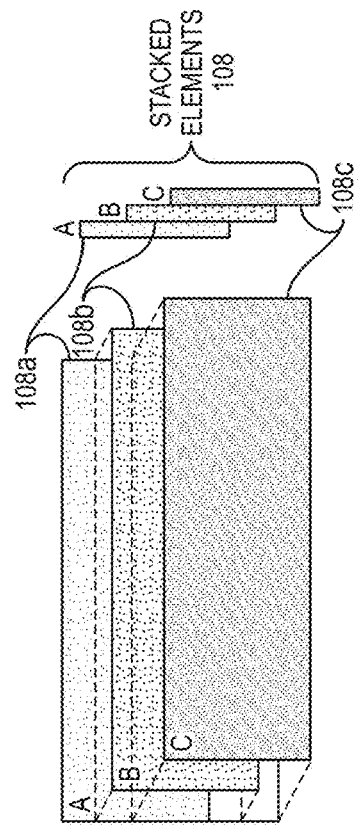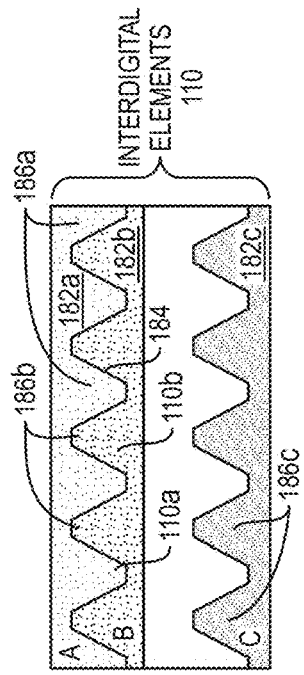

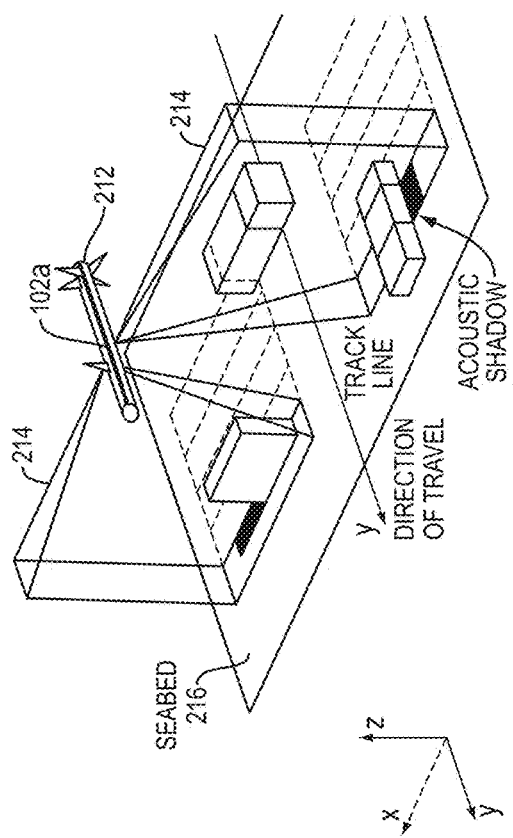
FIG. 2A
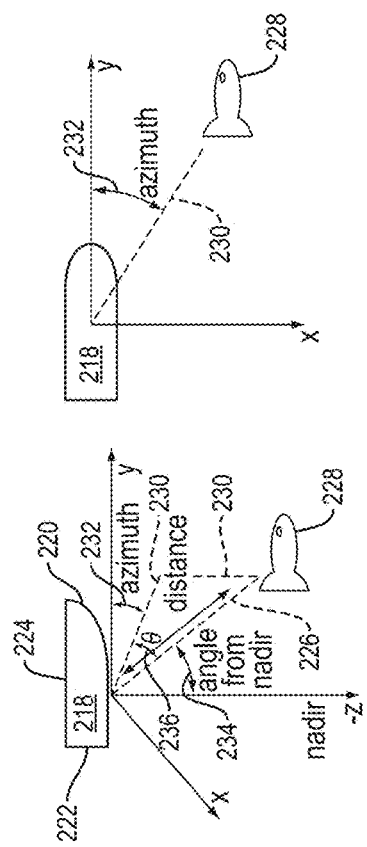
SIDE VIEW
FIG. 2B
TOP VIEW
FIG. 2C

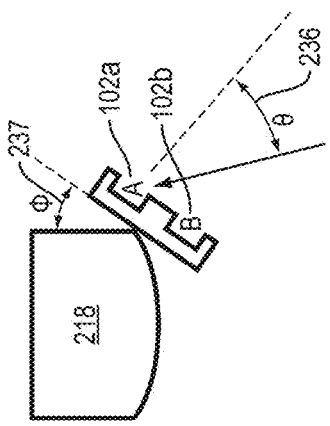
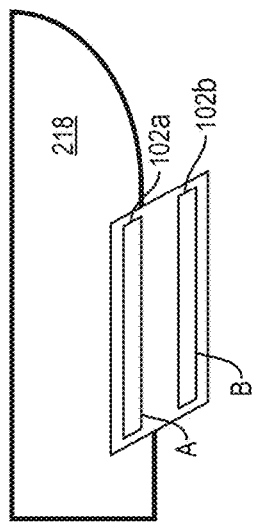
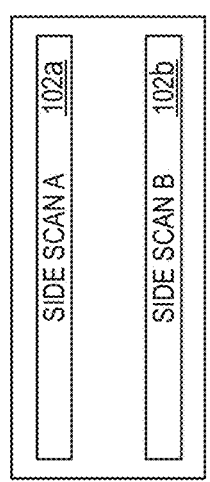
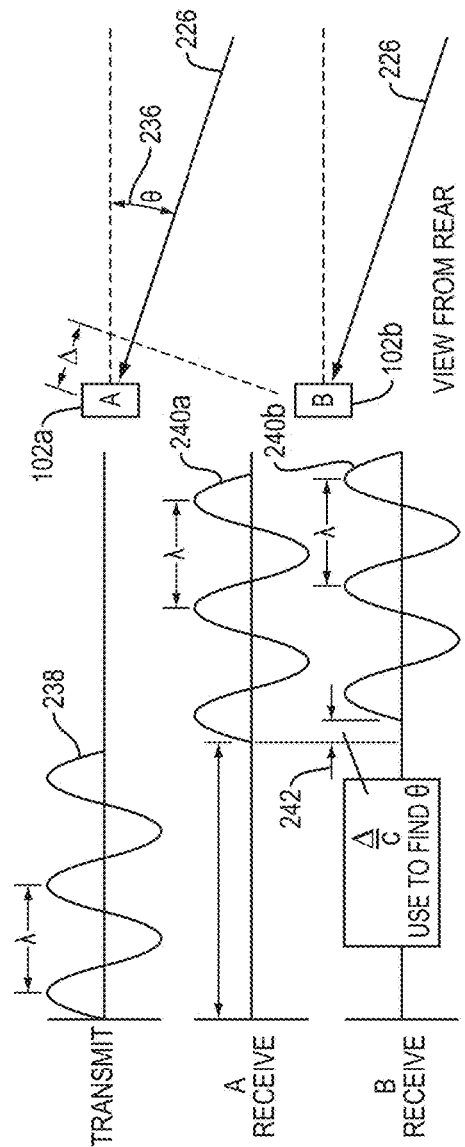

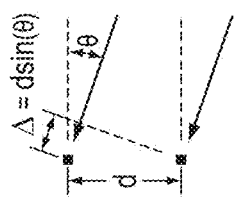

| TWO ELEMENT INTERFEROMETER | | RECTANGULAR ELEMENT IMPLEMENTATION | | CIRCULAR ELEMENT IMPLEMENTATION | |
|---|---|---|---|---|---|
| ELEMENT SEPARATION | INTERFEROMETER WRAPPING ANGLE | -10 dB REJECTION ANGLE | -20 dB REJECTION ANGLE (MAIN LOBE) | -10 dB REJECTION ANGLE | -20 dB REJECTION ANGLE (MAIN LOBE) |
| λ | 90° | 48° | 65° | 60° | NA |
| 1.25λ | 53° | 36° | 46° | 44° | 61° |
| 1.5λ | 42° | 29° | 37° | 35° | 47° |
| 2λ | 30° | 22° | 27° | 26° | 33° |
| 3λ | 19° | 14° | 18° | 17° | 21° |
| aλ | $\sin^{-1}\left(\frac{1}{a}\right)$ | $\sin^{-1}\left(\frac{0.738}{a}\right)$ | $\sin^{-1}\left(\frac{0.907}{a}\right)$ | $\sin^{-1}\left(\frac{0.869}{a}\right)$ | $\sin^{-1}\left(\frac{1.089}{a}\right)$ |

FIG. 2N

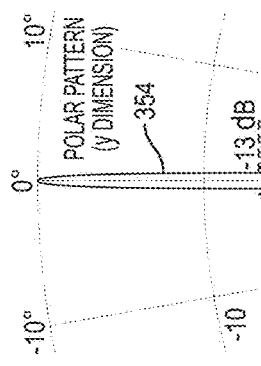
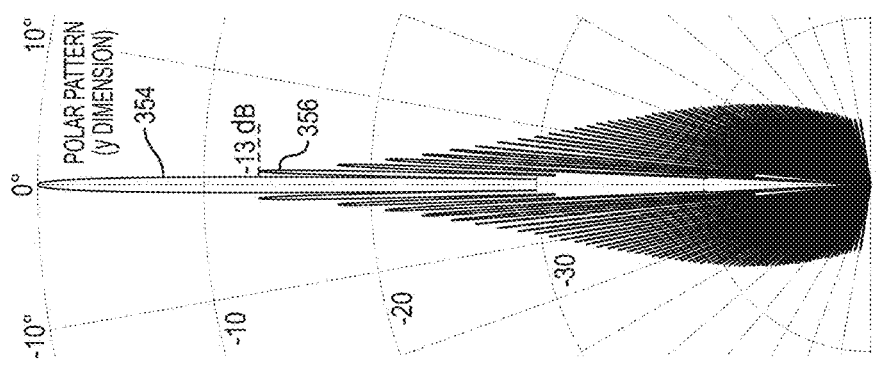
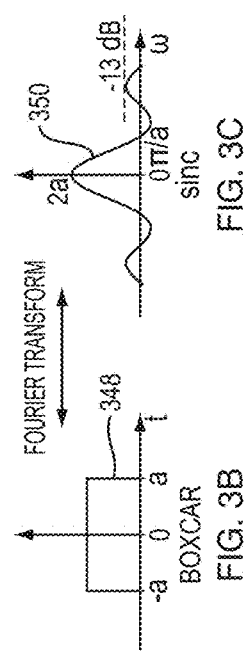
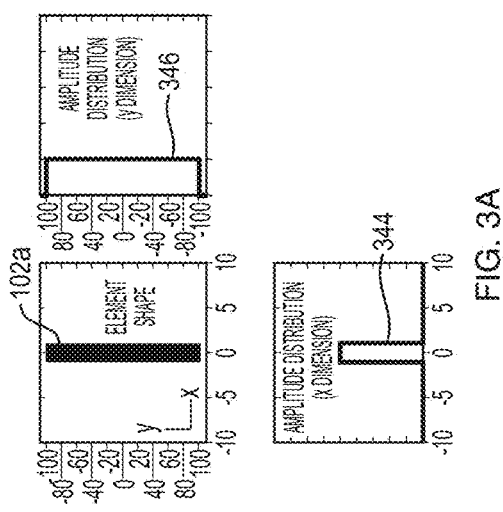
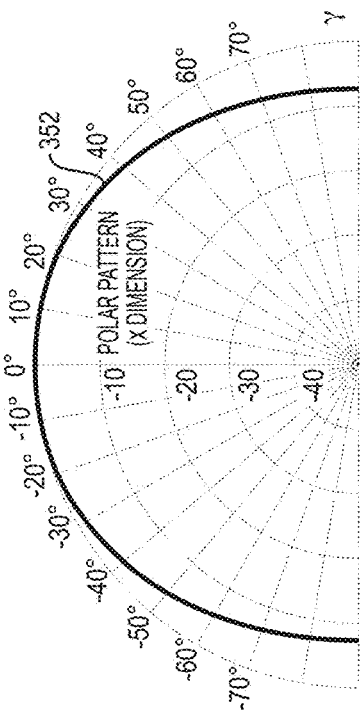

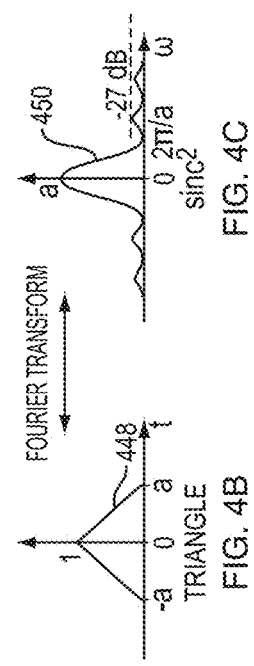
FIG. 4A
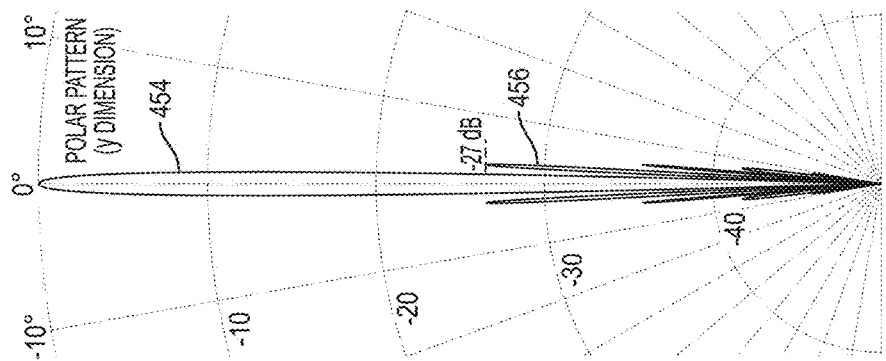
FIG. 4B
FIG. 4C
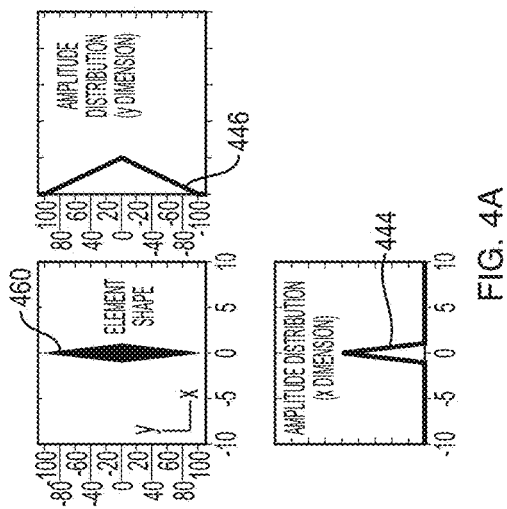
FIG. 4D
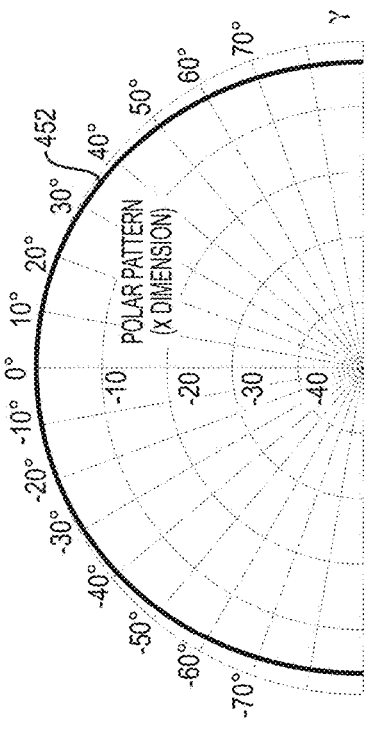
FIG. 4E

FIG. 5B GAUSSIAN
FIG. 5C GAUSSIAN

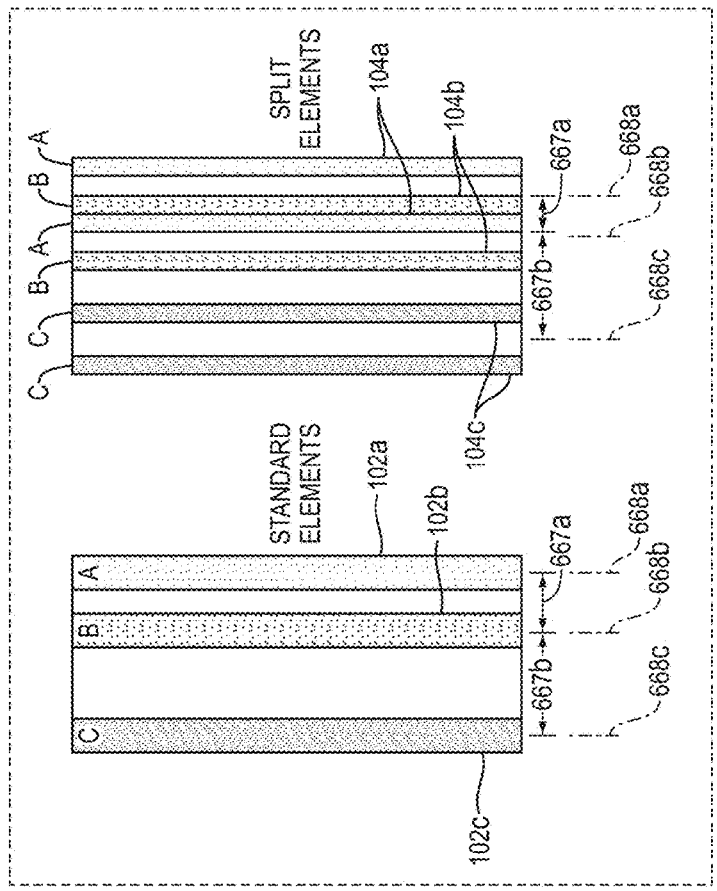
FIG. 6C
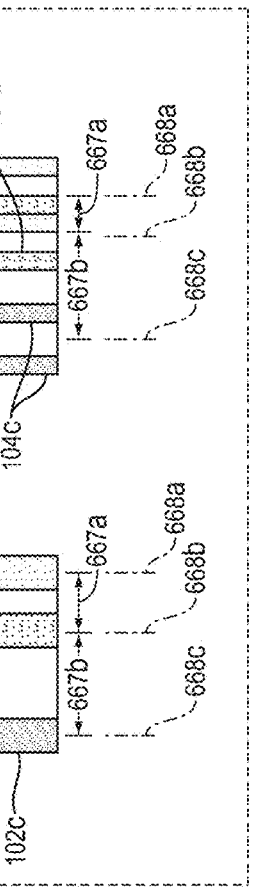
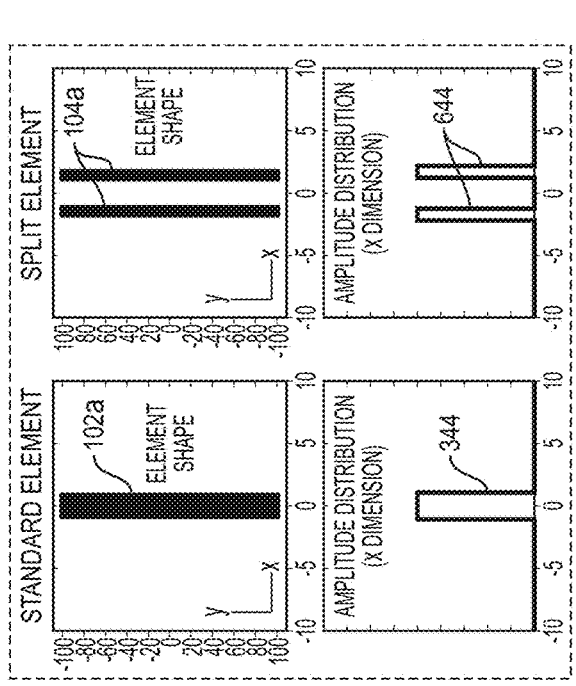
FIG. 6A
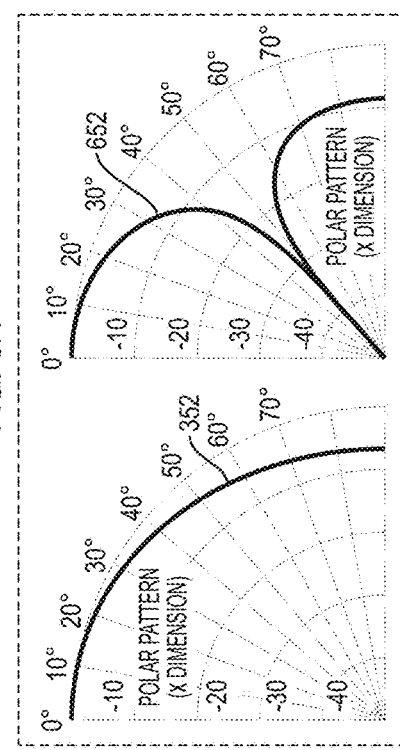
FIG. 6B

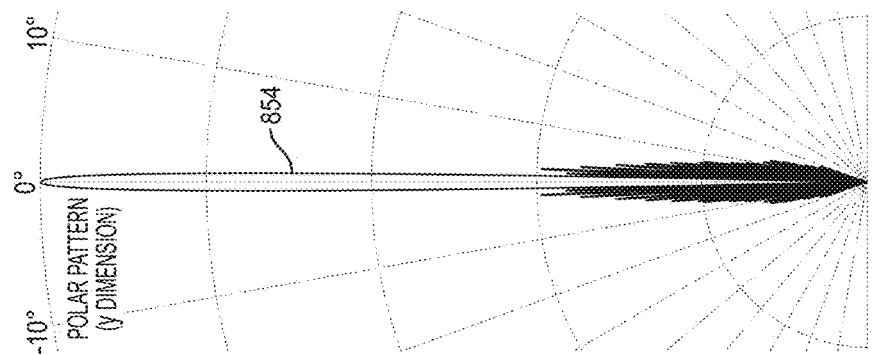
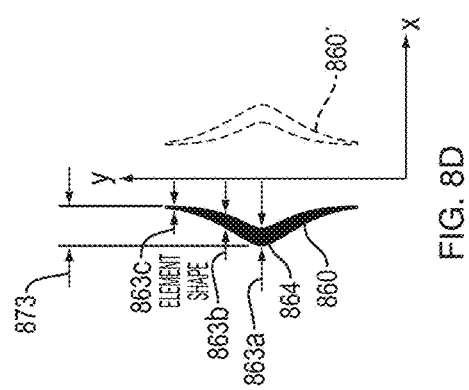
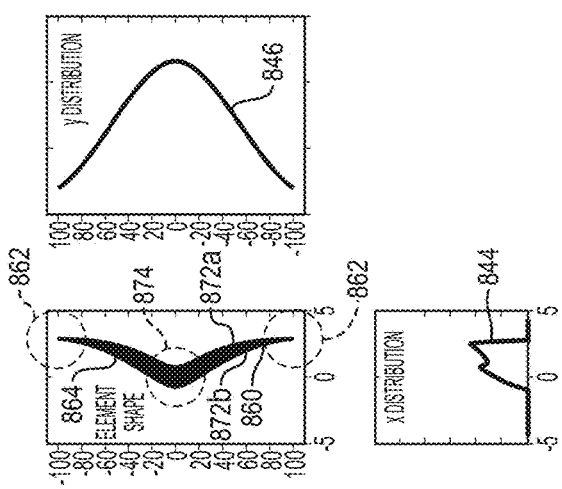
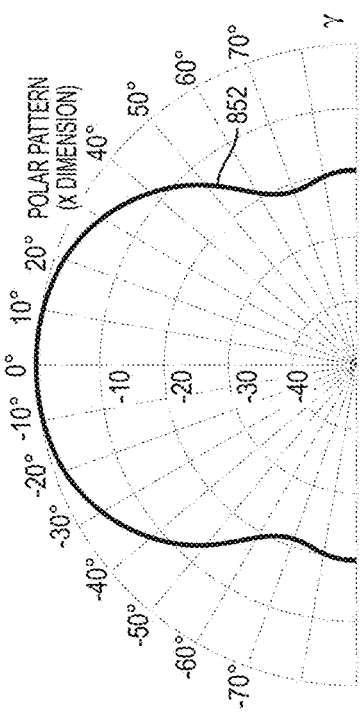

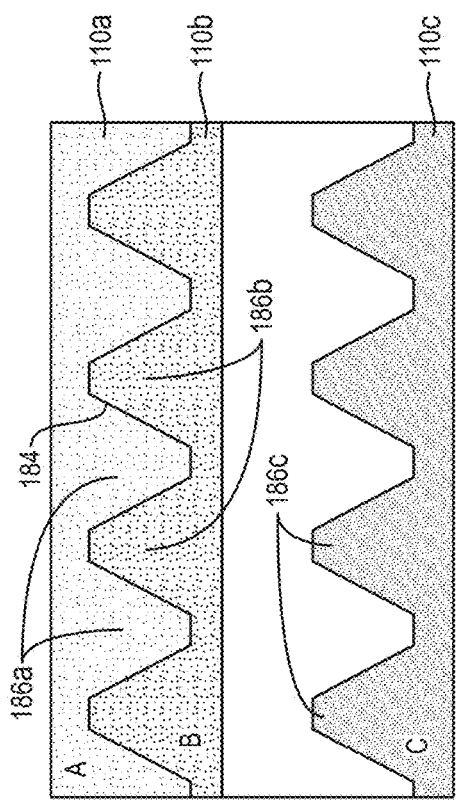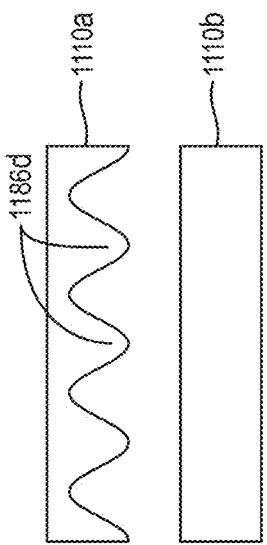
FIG. 11A
FIG. 11B

WARPED & SPLIT

WARPED & STACKED

SAWTOOTH & WARPED

SAWTOOTH & STACKED

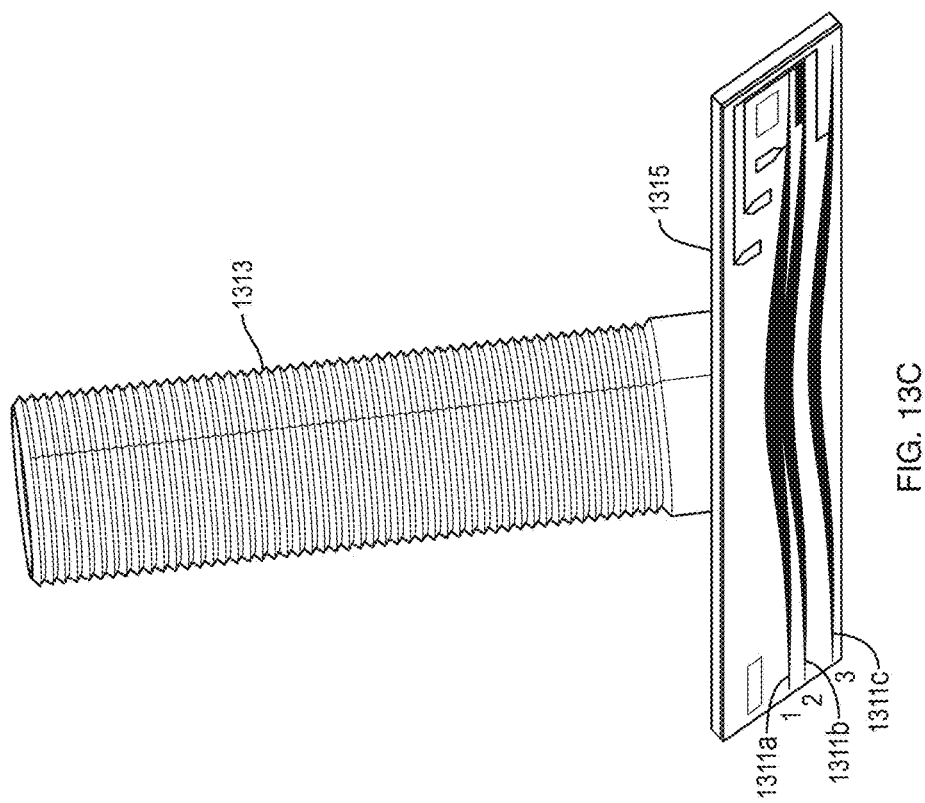

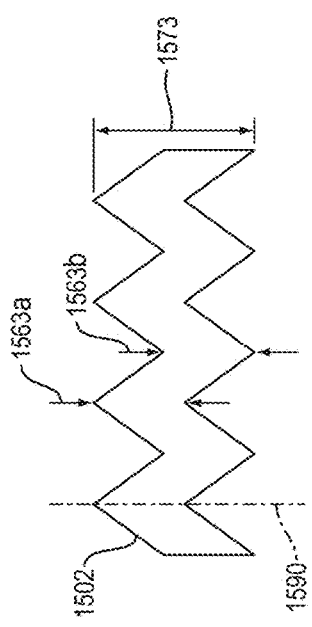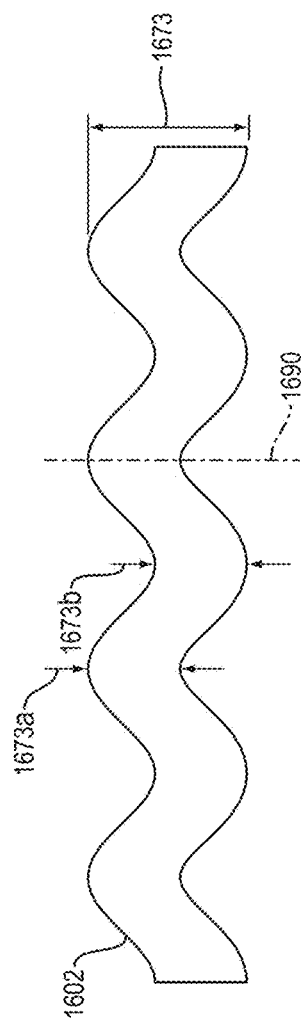

ACOUSTIC TRANSDUCER ELEMENT

RELATED APPLICATION

This application claims the benefit of U.S. Provisional Application No. 62/116,029, filed on Feb. 13, 2015. The entire teachings of the above application are incorporated herein by reference.

BACKGROUND

Side-scan sonar systems are typically configured to detect acoustic radiation within a fan-shaped region that is narrow in a plane parallel to motion of a water vessel and broad in a plane perpendicular to the motion of the vessel. Interferometric sonar measurements using multiple transducer detector elements can be used to determine a direction of an object detected in the water with respect to the water vessel with greater specificity. Phase differences between signals received at multiple acoustic transducers can be used to determine the arrival angle for an acoustic signal detected by the transducers.

However, aliasing can occur when the phase difference between signals received at the multiple transducers exceeds 360° (phase wrapping), corresponding to one complete temporal or spatial cycle of the received acoustic radiation. Aliasing limits the range of arrival angles that can be reliably determined with a given set of transducer elements.

SUMMARY

There is a need for increasing directionality of acoustic transducer elements for sonar systems in order to minimize or prevent aliasing due to phase wrapping in interferometric transducer systems. These systems include side scan sonar, side looking sonar, synthetic aperture sonar, swath sonar, and all systems that can use interferometry. The present disclosure relates to transducer element configurations that can increase directionality of acoustic transducers in interferometric sonars. Advantageous beam radiation patterns may be obtained. In some embodiments, transducer elements may be constructed of polyvinylidene difluoride (PVDF). PVDF can facilitate construction of a variety of transducer configurations that can be used to narrow transducer receiver beam patterns, while allowing the proper interferometric spacing between receivers. Embodiments can enable simultaneous control of element beamwidth to minimize spatial aliasing, radiation side lobe level to reduce echo contamination, and channel-to-channel spacing in an acoustic interferometer.

In one aspect, an acoustic transducer includes a transducer element with an acoustic radiative surface, the radiative surface including two warped edges at opposing sides of the radiative surface. The radiative surface may include two tapered ends, and each warped edge may extend from one of the tapered ends to the other. The transducer element may be a PVDF element, a ceramic element, a capacitive element, a magnetostrictive element, a fiber-optic hydrophone element, or an electrostrictive element.

Each of the two warped edges of the transducer element can have a periodic shape. Each of the two warped edges of the transducer element can be smooth. Each of the two warped edges can have a truncated Gaussian shape. Each of the two warped edges of the transducer element can define at least one 90° angle therein, the two warped edges further defining a second portion of the transducer element shifted from a first portion of the transducer element in a direction perpendicular to a major axis of the transducer element.

The transducer element may be a first transducer element, with the acoustic transducer further including a second transducer element with an acoustic radiative surface, the radiative surface including two warped edges at opposing sides of the radiative surface. The first and second transducer elements may be stacked against each other, with the acoustic radiative surfaces of the first and second transducer elements partially overlapping. The transducer may include an electrical circuit configured to drive (or receive signals by) the first and second transducer elements at the same frequency, and the circuit may be configured to acquire interferometric sonar data based on signals received by the first and second transducer elements.

The acoustic transducer can further include one or more additional transducer elements, each element having a respective acoustic radiative surface including two warped edges at opposing sides of the respective radiative surface.

Each of the first and second transducer elements may be divided into at least two spatially separated element portions electrically coupled to each other, and the element portions of the first transducer may be configured to interleave the element portions of the second transducer.

The first and second transducer elements can occupy a common surface and overlap each other. Further, the first transducer element can include a first plurality of non-contiguous sub-elements electrically coupled to each other, and the second transducer element can include a second plurality of non-contiguous sub-elements electrically coupled to each other. The first plurality of sub-elements can be electrically isolated from the second plurality of sub-elements.

In another aspect, an acoustic transducer includes a first transducer element divided into at least two spatially separated element portions electrically coupled to each other. The transducer also includes a second transducer element divided into at least two spatially separated element portions electrically coupled to each other, with the element portions of the second transducer configured to interleave the element portions of the first transducer. The transducer may also include an electrical drive circuit configured to drive (or receive signals by) the first and second transducer elements at the same frequency. The electrical drive circuit may be further configured to drive (or receive signals by) the first and second transducer elements with mutually distinct phases.

The transducer may include an electrical receive circuit configured to detect a phase difference between acoustic signals intended to be received at the first and second transducer elements. The element portions of the first and second transducer elements may be rectangular in shape and have longer sides oriented parallel to one another and to axes along which the two transducer elements, respectively, are divided. At least one element portion of the second transducer element may be in physical contact with at least one element portion of the first transducer element.

The element portions of the first transducer element may have a first acoustic center and the element portions of the second transducer element may have a second acoustic center. The first and second transducer elements can be PVDF, ceramic, capacitive, magnetostrictive, fiber-optic, or electrostrictive transducer elements. Each of the first and second transducer elements can have an acoustic radiative surface with two warped edges at opposing sides of the radiative surface. Each of the warped edges can have a truncated Gaussian shape. The acoustic transducer can further include one or more additional transducer elements, each additional element divided into at least two spatially separated element portions electrically coupled to each other.

In yet another aspect, an acoustic transducer includes a transducer element having an acoustic radiative surface with an edge having periodic elongations protruding therefrom. The edge with periodic elongations may have a sawtooth or sinusoidal shape. The transducer element can be a PVDF, ceramic, capacitive, magnetostrictive, fiber-optic hydrophone, or electrostrictive transducer element. The edge having periodic elongations protruding therefrom can be a warped edge, the transducer element further including an additional warped edge, the warped edge and additional warped edge at opposing sides of the radiative surface of the transducer element. The additional warped edge can have a truncated Gaussian shape.

The transducer element can be a first transducer element, and the acoustic transducer can further include a second transducer element having periodic elongations protruding therefrom, with the first and second transducer elements situated adjacent to one another. The periodic elongations of the second transducer element may be offset from the periodic elongations of the first transducer element, and the edges of the first and second elements with periodic elongations may fit against each other to form a common edge.

The transducer can also include an electrical drive (or receive) circuit configured to drive (or receive signals by) the first and second transducer elements at the same frequency. The electrical circuit may also be configured to drive (or receive signals by) the first and second transducer elements with mutually distinct phases. Furthermore, the second transducer element may be stacked against the first transducer element, and the radiative surface of the second transducer element may be overlapping with a radiative surface of the first transducer element. The acoustic transducer can also include one or more additional transducer elements, each of the additional transducer elements having an edge with periodic elongations protruding therefrom.

In still another aspect, an acoustic transducer includes a first transducer element divided into first and second spatially separated element portions electrically coupled to each other. The acoustic transducer can also include a second transducer element divided into first and second spatially separated element portions electrically coupled to each other. The second element portions of the first and second transducer elements can be spatially offset from the first element portions of the first and second transducer elements, respectively, in a direction perpendicular to a major axis of the first transducer element.

In yet another aspect, an acoustic transducer includes a transducer element with an acoustic radiative surface having a skewed diamond shaped. The transducer element can be a first transducer element, and the acoustic transducer can also include a second transducer element with an acoustic radiating surface that has a skewed diamond shape. Furthermore, the acoustic transducer can include one or more additional transducer elements with acoustic radiative services having skewed diamond shapes.

The first and second transducer elements can form part of an interferometric transducer array with a long axis and a short axis. Each of the first and second transducer elements can have a respective acoustic center and a respective width along the short axis. A center-to-center spacing between the respective acoustic centers along the direction of the short axis can be smaller than the sum of the respective widths along the short axis. The transducer element can be a PVDF transducer element.

The transducer types can also be crystal or piezo-composite.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1A illustrates prior art acoustic transducer elements.

FIGS. 1B-1E illustrate transducer elements according to several embodiments of the invention.

FIG. 2A is a perspective illustration of typical side-scan sonar geometry.

FIGS. 2B-2C includes side-view and top-view illustrations of angles relevant to side-scan sonar imaging.

FIG. 2D illustrates a typical two-element transducer used in interferometric side-scan sonar imaging.

FIGS. 2E-F illustrate how the transducer of FIG. 2D can be mounted to a water vessel.

FIG. 2G illustrates transmit and receive signals and angles relevant to interferometric side-scan sonar imaging using the two transducer elements illustrated in FIG. 2D.

FIG. 2N is a table with two-element interferometer wrapping angles and corresponding 10 dB and 20 dB rejection angles for rectangular and circular element implementations of the two-element interferometer.

FIGS. 3A-E illustrate element shape, amplitude distributions, spatial Fourier transform, and X and Y polar radiation distributions for prior art rectangular transducer elements.

FIGS. 4A-E include graphs similar to those of FIGS. 3A-E, respectively, for diamond-shaped transducer element.

FIGS. 5A-E include graphs similar to those of FIGS. 3A-E, respectively, for a prior art transducer element having tapered ends and edges symmetric to one another.

FIG. 6A-C illustrate comparisons between element shapes, X axis amplitude distributions, X axis polar radiation patterns, and transducer configurations for a prior art rectangular transducer element and a split element for interleaving elements according to an embodiment of the invention.

FIG. 8A illustrates element shape and X and Y amplitude distributions for an embodiment tapered, warped transducer element.

FIGS. 8B-C are graphs illustrating calculated X axis and Y axis polar radiation distributions, respectively.

FIG. 8D illustrates how embodiment warped elements have an overall width greater than any local width and can lack inversion symmetry.

FIG. 11A illustrates embodiment transducer elements with periodic elongations configured to interleave with one another.

FIG. 11B illustrates an embodiment transducer element with sinusoidal periodic elongations.

FIG. 13C is a model illustrating how transducers such as those illustrated in FIGS. 13A-B can be configured for side-scan applications with through-hull mounting.

FIG. 15 illustrates a warped sawtooth transducer element.

FIG. 16 illustrates a warped sinusoidal transducer element.

DETAILED DESCRIPTION

Figure 2H:
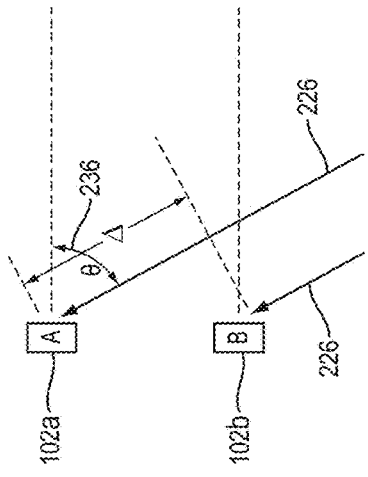
FIGS. 2H-I illustrate differences in geometry for interferometric sonar imaging with shallow and steep angles, respectively.

A description of example embodiments of the invention follows.

FIG. 1A illustrates a prior art acoustic transducer 102 that includes three transducer elements 102a-c that can be used for interferometric side-scan sonar measurements, for example. In particular, the elements 102a-c are rectangular, which is a typical geometry used for side-scan imaging systems for ease of manufacture and to produce the appropriate radiation pattern for side-scan imaging, as illustrated further in FIG. 2A.

FIGS. 1B-1E illustrate various transducers 104, 106, 108, and 110, respectively, showing features of embodiment devices. These transducer configurations are useful for narrowing a distribution of radiation produced by the transducer elements in the XZ plane shown in FIG. 1A while maintaining both receiver sensitivity and acoustic center-to-center element spacing (illustrated in FIG. 10). In particular, the transducer 104 includes split (divided) elements 104a, 104b, and 104c, each of the elements divided into two spatially separated element portions electrically coupled to each other. Electrical coupling is further described hereinafter in conjunction with FIG. 12A. With the electrical coupling between the element portions 104a, for example, the element portions 104a can be driven by the same electrical signal, with the same driving frequency and wavelength to produce radiation as a single transducer element but with a radiation distribution that is narrower than if the element portions 104a were spatially coupled to each other. FIG. 1B illustrates that a transducer with element 104a can include one or more additional elements (e.g. elements 104b-c), each additional element divided into at least two spatially separated element portions. The spatially separated element portions of each additional element can be electrically coupled to each other to be driven or to receive as a single element, as described further hereinafter.

Figure 12A:
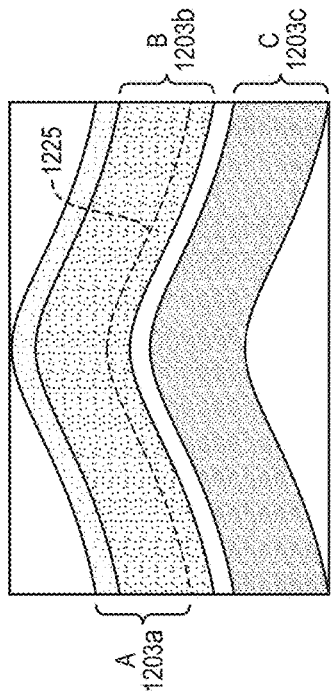
FIG. 12A illustrates embodiment warped and divided transducer elements.

With the element portions 104b spatially separated from each other but electrically coupled to each other, the element portions 104b also act as a single transducer and can be configured to interleave with the elements 104a as shown in FIG. 1B. In particular, one element portion 104a is situated between the two element portions 104b. The divided elements 104a-c are further described hereinafter in conjunction with FIGS. 6A-C and FIG. 10A. Moreover, as illustrated in FIG. 12A, divided elements need not be rectangular and can have other shapes in other embodiments. Furthermore, while three sets of divided elements 104a-c are illustrated in FIG. 1B, in other embodiments, only two sets of split elements are present in a transducer.

FIG. 1C illustrates a transducer 106 with warped elements 106a-c. The warped elements 106a-c have acoustic radiative surfaces 182a-c, respectively. Each radiative surface includes two warped edges 172a and 172b at opposing sides of the respective radiative surfaces 182a-c. Furthermore, while additional transducer elements (first warped element 106a and additional warped elements 106b-c) are shown in FIG. 1C, in other embodiments, only one warped element 106a is required (e.g., where interferometric measurements are not required). Warped elements are further illustrated and described in conjunction with FIGS. 7B-C, 8A-D, 9, 12A-C, 12E, and 13, for example.

The warped elements 106a-c have smooth edges, meaning that there are no angles formed in the edges. In other embodiments, as described hereinafter in connection with FIGS. 12C and 14A, for example, angles may be formed in the edges, such as 90° angles or angles forming a sawtooth pattern in the edges, for example.

Figure 12B:
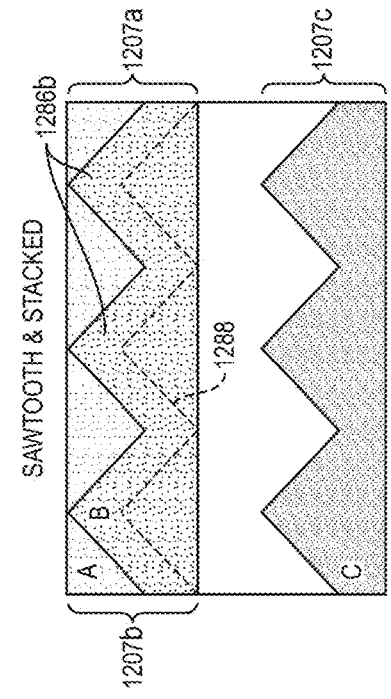
FIG. 12B illustrates embodiment warped and stacked transducer elements.
Figure 12C:
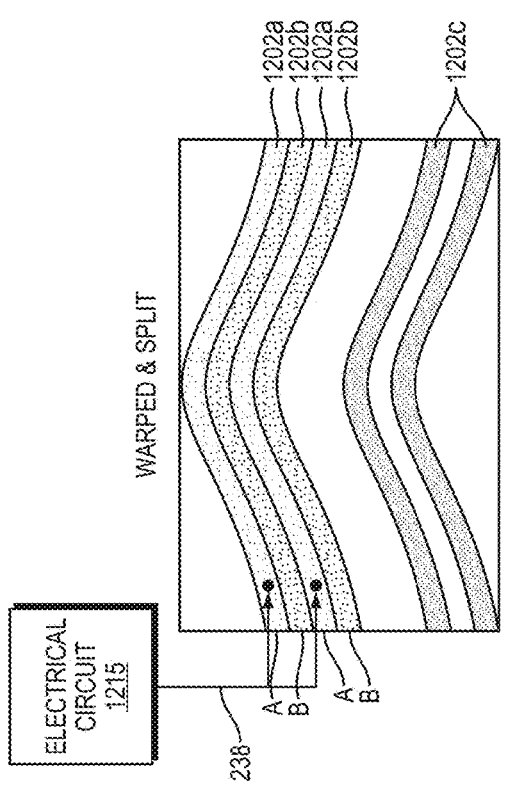
FIG. 12C illustrates warped transducer elements with periodic sawtooth elongations according to an embodiment.
Figure 12D:
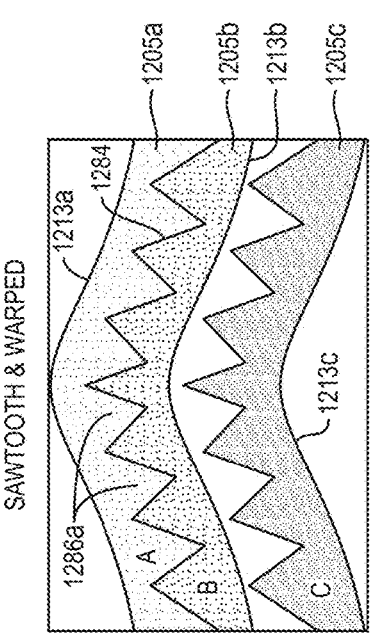
FIG. 12D illustrates embodiment stacked transducer elements with sawtooth periodic elongations.
Figure 12E:
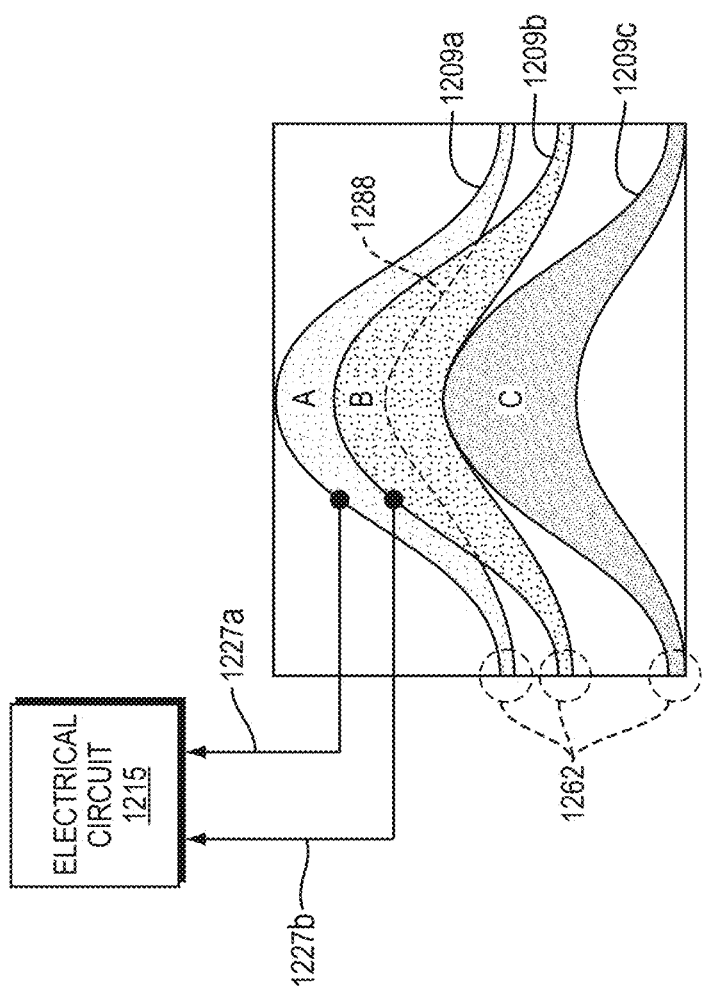
FIG. 12E illustrates embodiment warped, tapered, stacked transducer elements with an electrical circuit connected thereto.

FIG. 1D illustrates a transducer 108 with stacked planes 108a-c containing elements. Each plane can contain an element shaped such as warped Gaussian (e.g. 182a), or a rectangle (e.g. 102a), or sawtooth (e.g. 182a in FIG. 1E). There are two views in FIG. 1D: a perspective, exploded view (left), and a side-view (non-exploded) (right). While three stacked element planes 108a-c are illustrated in FIG. 1D, in other embodiments, only two stacked element planes are used. Stacking elements enables elements to be wider along the X axis, which narrows the radiation distribution in the XZ plane for more directive radiation patterns while maintaining a center-to-center spacing of acoustic centers of the elements 108a-c, as further illustrated in FIG. 10B. Stacking works when each transducer element is acoustically transparent, allowing wave penetration to reach each of the stacked planes without substantial loss of energy. This is particularly useful with PVDF transducers. The embodiment transducer 108 is further illustrated in FIGS. 10B-C. Furthermore, stacked elements are not limited to rectangular shapes, and some examples of non-rectangular, stacked elements are illustrated in FIGS. 12B and 12D-E, for example.

FIG. 1E illustrates a transducer 110 with interdigital elements 110a-c. The transducer elements 110a and 110b adjacent to each other, and the transducer element 110c is adjacent to element 110b. Each of the elements 110a-c has an acoustic radiative surface 182a-c, respectively, with an edge having periodic elongations 186a-c, respectively, protruding therefrom. Each of the transducer elements 110a-c, therefore, includes an acoustic radiative surface 182a-c with an edge having periodic elongations with a partial sawtooth shaped.

In other embodiments, the transducer can vary from the transducer 110 illustrated in FIG. 1E and can include only two transducer elements, for example. Furthermore, in some embodiments, only one of the transducer elements has an edge with periodic elongations. In yet other embodiments, the interdigital elements 110a-b do not fit together to form a common edge 184, as shown in FIG. 1E. In still other embodiments, an acoustic transducer includes only the single element 110a, an edge of the radiative surface having periodic elongations protruding therefrom, the edge defining a periodic shape. The configuration of the transducer elements 110a-c also allows for the radiation distribution in the XZ plane to be narrowed compared to a radiation pattern produced by the elements 102a-c, for example, while enabling the same spacing between acoustic centers (not shown). The interdigital elements 110a-c are also illustrated in FIG. 11A, and other embodiment devices including transducer elements with periodic elongation are illustrated in FIGS. 12C-D, for example.

It should be noted that there is an equivalency between the radiation pattern produced when a transducer is driven to produce acoustic radiation and the pattern indicating the sensitivity of a transducer to radiation received by the transducer when it is operated in detection mode. Therefore, throughout this application, when radiation patterns are described, it should be understood that radiation detection patterns are equivalent to radiation production patterns in terms of strength distribution. Furthermore, while both prior art transducers, such as the transducer 102 in FIG. 1A as well as embodiment transducers, such as the transducers 104, 106, 108, and 110 in FIGS. 1B-1E, can be used to both transmit acoustic radiation and to detect acoustic radiation at different times, in some cases, separate transducers can be used for transmitting acoustic radiation, and the use of embodiment transducers can be confined to detection. All the radiation patterns and embodiments described herein are relevant to detection receiver applications.

FIG. 2A is a perspective illustration of a typical side-scan sonar imaging application. A towfish 212, which can be pulled behind a boat or other water vessel, has the prior art acoustic transducer 102a mounted thereon. The transducer 102a both produces acoustic radiation and detects reflected radiation over a fan-shaped region 214. The towfish 212 also includes a second prior art transducer (not shown) on the other side of the towfish that produces a second radiation pattern 214 on the other side of the towfish. These are usually referred to as the port and starboard transducers. Objects anywhere in the detection regions 214 or at a seabed 216 can be detected. Transducer 102 is traditionally long in the Y direction and narrow in the X direction, so that its radiation patterns (for both transmit and receive) are narrow along Y and wide in the XZ plane. The towfish 212 travels in the Y direction indicated in FIG. 2A, with an X direction perpendicular to the direction of travel and a Z direction perpendicular to both X and Y axes. As described further hereinafter, interferometric transducers can be used to narrow a region within which a detected object can be determined to be situated. While FIG. 2A shows a towfish 212 with the acoustic transducer 102a, the acoustic transducer 102a can also be mounted to a boat (illustrated in FIG. 2B) or any other water vessel, for example.

FIGS. 2B-2C illustrate angles relevant to side-scan sonar imaging. In particular, a boat 218 having a front section 220, a rear section 222, and a top section 224 travels in the Y direction on the water. A dashed line 226 joins a transducer (not shown) on the boat 218 and a detection object 228 (a fish in FIG. 2B). A dashed line 230 extends from the boat 218 in the direction of the detection object 228 but in the X-Y plane. FIG. 2B includes a side view of the boat 218 traveling in a Y direction on water in the X-Y plane. For side-scan imaging, an azimuth angle 232 between the Y-axis and the line 230 is well known due to the shape of the radiation pattern illustrated in FIG. 2A. However, the angle θ 236, which is equal to 90° minus the angle 234 from a nadir (−Z axis), is not well known unless interferometric sonar measurements are used. FIG. 2C is a top view of the boat 218 and object 228.

FIG. 2D illustrates a typical acoustic transducer configuration including the two rectangular elements 102a and 102b, which can be used for interferometric side-scan sonar measurements to determine the angle θ (shown in FIG. 2B) with greater accuracy.

FIGS. 2E-F are side-view and rearview illustrations showing where the transducer elements 102a and 102b are typically mounted to a boat for side-scan imaging.

FIG. 2G illustrates typical signals and geometry using a dual transducer configuration such as the configuration illustrated in FIGS. 2D-F. The left side of FIG. 2G illustrates a transmission signal 238, which can be produced by the transducers 102a-b or by a separate transducer (not shown). The transmission signal 238 and received signals 240a and 240b received by the transducers 102a and 102b, respectively, have wavelength λ. A difference 242 and target distance measured by the receivers 102a and 102b can be used to determine the arrival angle θ 236, as understood in the art of interferometric transducers. Namely, a time-of-arrival difference between the signal received at the transducer 102a and the signal received at the transducer 102b can be used to determine a path length difference Δ which in turn can be used to determine the arrival angle θ. The target angle from the nadir is the arrival angle θ 236 plus a mounting angle γ 237 illustrated in FIG. 2F.

Figure 2J:
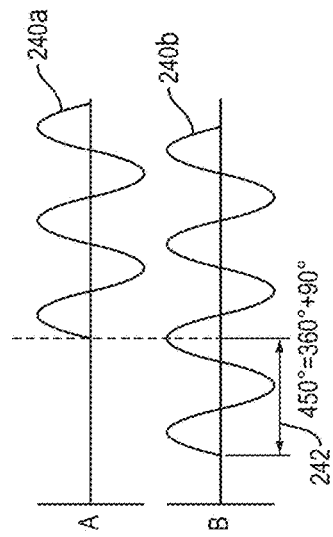
FIGS. 2J-K illustrate phase differences in transducer receives signals for the shallow and steep measurement angles illustrated in FIGS. 2H-I, respectively.
Figure 2I:
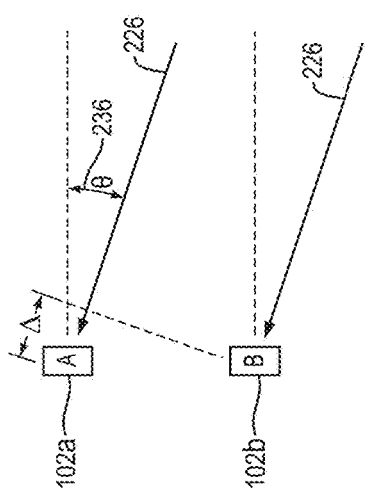

FIGS. 2H-K illustrate a phase wrapping issue that can occur in interferometric sonar measurements when the arrival angle θ is too large. FIG. 2H is the same diagram shown on the right side of FIG. 2G, in which the arrival angle θ 236 is relatively small. When θ is small, the path difference Δ for radiation 226 arriving at the transducers 102a and 102b is correspondingly small. In contrast, FIG. 2I shows corresponding values when the arrival angle θ is relatively large. In this case, the path difference for radiation 226 arriving at the two detectors 102a and 102b is relatively large.

Figure 2K:
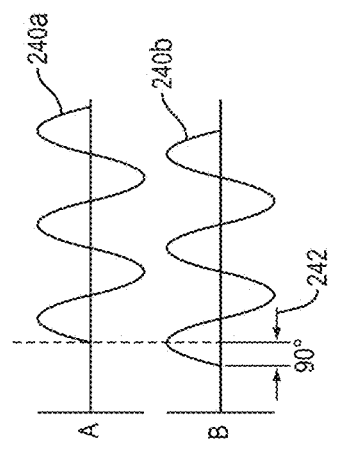

FIGS. 2J and 2K illustrate further effects of small and large arrival angles, respectively, on interferometric measurements. Here, it should be noted that in practice, a phase difference 242 between signals received at the transducers, rather than a time difference, is used to determine the angle θ. FIG. 2J illustrates the phase difference 242 for the case of the relatively small arrival angle in FIG. 2H. In this case, the phase difference 242 between the signals 240a and 240b received at the transducers 102a and 102b, respectively, is 90°. Because the difference 90° is smaller than a full cycle of 360°, the arrival angle θ can be determined unambiguously. In contrast, in FIG. 2K, corresponding to the large arrival angle θ in FIG. 2I, the phase difference 242 for the arriving signals is 450°=360°+90°. Thus, the phase-based measurement in FIG. 2K yields the same results as the phase-based measurement in FIG. 2J when calculations to determine the angle θ are performed, and the angle θ can be erroneously calculated to be the same for both FIGS. 2H and 2I. In other words, reflections arriving from steep arrival angles can be processed as arriving from shallow arrival angles. It is desirable, therefore, to have transducer receivers with narrower beams in the XZ plane than the large fan-shaped beams 214 illustrated in FIG. 2A. A phase difference of 360° is the limit at which phase can be determined unambiguously, and an arrival angle θ corresponding to the phase difference of 360° is called the wrapping angle. When the phase difference 242 exceeds 360°, as shown in FIG. 2K, this is referred to as phase wrapping.

The desirability for relatively narrower beams in the XZ plane and for close spacing of transducers can also be explained in further reference to FIGS. 1A and 1B, as follows. In FIG. 1A, the three channels (from three acoustic elements 102a-c) are at different vertical axis positions, as illustrated in the figure. Note that each transducer (channel) 102a, 102b, or 102c also has a small finite vertical width. The width for each element could be made smaller, making the vertical beam for each element wider. Conversely, the respective vertical widths could be made larger, thereby making the respective vertical beams for each element narrower. This is a consequence of the inverse relationship between wavelength λ, and aperture length L, and the resulting radian beamwidth λ/L.

It is usually preferable for a mapping sonar system to have its transmit, receive, or both apertures designed to ignore echoes from zenith or from nadir, with respect to the sonar's main radiation lobe direction, because these extraneous echoes corrupt the desirable echoes from the intended mapping region in the forward- or side-looking direction. This means that the vertical aperture of a single acoustic channel should have a height extent (to control its own vertical beamwidth), and shape (to control its own vertical side lobes) to reduce energy from directly overhead (zenith) surface scattering or from the directly beneath from bottom scattering, or multiple bounces from both. In a single channel system, without interferometry, this imposes no restrictions other than transducer space. However, in an interferometric system with more than one transducer, the desired single-channel vertical beam width and side lobe control, can conflict with the center-to-center vertical separation of the interferometer channels. Embodiments described herein have the advantage of providing favorable characteristics simultaneously for side lobe control, center-to-center interferometer separation, and main beam width.

FIG. 1B illustrates how the desired vertical separation between interferometer channels can be maintained, while at the same time having some control over each channel's vertical beamwidth. In FIG. 1B, the effective vertical center of channels 104a, 104b, and 104c is maintained at the same position as in FIG. 1A, even though each element is geometrically divided into two pieces that are electrically coupled.

Figure 2M:
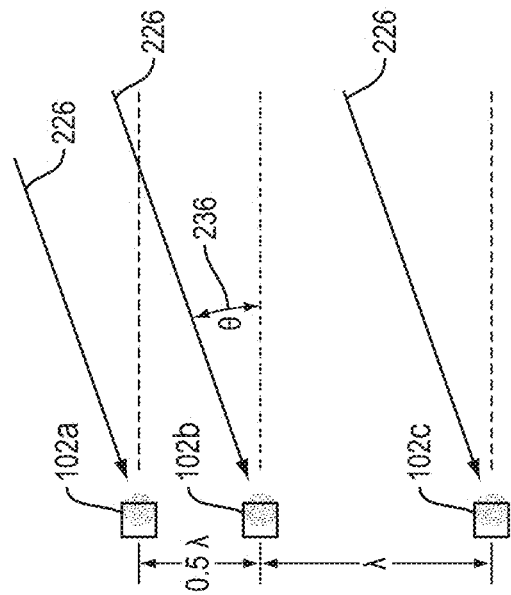
FIGS. 2L-M illustrate geometries relevant to calculation of phase wrapping conditions for two-element and three-element interferometric sonar systems, respectively.
Figure 2L:
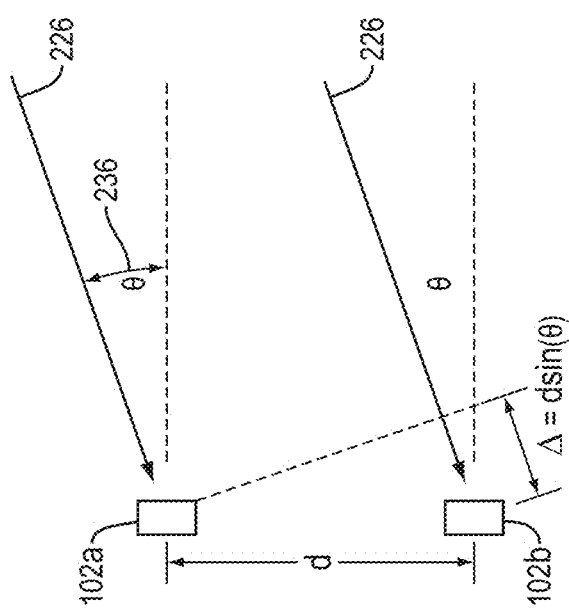

FIGS. 2L and 2M are used to illustrate far-field phase wrapping conditions for two-element and three-element transducer arrays. In FIG. 2L, which illustrates the two-element case, the two transducer elements 102a and 102b have a separation d. In a two-element array, the phase will wrap when the arrival path difference Δ is equal to one wavelength λ (see FIG. 2G) of the acoustic radiation 226 received. This relationship can be expressed as d sin θ=λ⇒

$$\theta = \sin^{-1}\left(\frac{\lambda}{d}\right).$$

Thus, if d>λ, there will be phase wrapping.

FIG. 2M illustrates a common three-element configuration (also illustrated in FIG. 1A). In the three-element case, the same phase wrapping conditions described above for the two-element case, namely, that there is phase wrapping for d>λ, apply for each pair of elements used in the array. Varied spacing between pairs of elements allows greater flexibility in measurements. For example, the elements 102a and 102b, with the separation of 0.5λ, can be used. In addition, a measurement can be obtained with the pair of elements 102b and 102c, with the separation of λ, or with the elements 102a and 102c, with a total spacing of 1.5λ. Typically, the outer pair 102a and 102c are usually not placed less than one wavelength apart, because the receivers need to be large enough to provide sufficient sensitivity. Thus, phase wrapping is also an issue in the three-element design of FIG. 2M. For example, the elements 102a-102c, with the largest spacing 1.5λ, have a 42° wrapping angle (for a sonar used in water, with nominal 1500 m/s sound speed). Thus, FIGS. 2L and 2M further illustrate the desirability of having transducer receivers that are more directional in the XZ plane illustrated in FIG. 2A to avoid phase wrapping.

FIG. 2N includes a table that lists examples of two-element interferometer phase wrapping angles. The 10 dB and 20 dB rejection angles for implementations with standard rectangular and circular elements are also shown. For example, if the center-to-center spacing d between the elements is 1.5λ, the interferometer phase wrapping angle is 42°. The largest rectangular elements that can be used are 1.5λ, wide (no gap between) which have 10 dB and 20 dB rejection angles of 29° and 37°, respectively, in water. Similarly, the largest circular elements that can be used are 1.5λ, in diameter, which have 10 dB and 20 dB rejection angles of 35° and 47°, respectively, in water.

The above examples illustrate that for two-element interferometers, if 10 dB rejection is sufficient, standard transducer elements such as elements 102a-c in FIG. 1A, will be sufficient. However, if 20 dB rejection is required, for example, disk-shaped elements will not be sufficient, and rectangular-shaped elements barely meet the 20 dB rejection requirement under the best-case scenario of having no gap between the elements. In addition, the rejection angles listed in the table in FIG. 2N are for the main lobe of radiation. Rectangular elements have a peak side lobe amplitude of approximately −13 dB and thus would fail the 20 dB rejection requirements in many circumstances. Furthermore, these considerations are based on calculations using the widest possible elements. In practice, however, neither standard disk-shaped elements nor standard rectangular elements are likely to work when 20 dB rejection is required.

For the three-element case illustrated in FIG. 2M, the phase wrapping angle in water is θ=42°, assuming that the elements 102a and 102c are used together. The maximum transducer element widths are 0.5λ, the limitation imposed by the adjacent transducer elements 102a and 102b with the closest spacing. Both standard disk and standard rectangle elements have very wide receive beams, namely a maximum rejection of 2.8 dB at 90° for a disk shaped element of diameter 0.5λ, and a maximum rejection of 3.9 dB at 90° for a rectangular element of width 0.5λ. Thus, in the three-element design of FIG. 2M, neither standard element can provide 10 dB of rejection at any angle, and it should also be noted that both standard elements have very little rejection (1 to 2 dB) at 42°. Thus, if more than 10 dB of rejection is required, both standard rectangular and standard disk elements are unacceptable.

For an arbitrary array of standard elements with largest element spacing d, the phase wrapping angle is $$\theta = \sin^{-1}\left(\frac{\lambda}{d}\right).$$

Rectangular elements would need to be of width W>0.738d for a 10 dB rejection at the wrapping angle, or W>0.908d for 20 dB rejection at the wrapping angle. Disk-shaped elements would need to be of diameter D>0.869d for 10 dB rejection at the wrapping angle, or D>1.09d for 20 dB rejection at the wrapping angle (physically impossible). For transducer element arrays with three or more elements, meeting all of those requirements simultaneously is impossible. Furthermore, even for two-element arrays, practical spacing requirements can make some or all those requirements unobtainable.

As described in part in conjunction with FIGS. 1B-E, embodiments of the invention can overcome these difficulties by stacking or dividing transducer elements, for example. However, both these and additional benefits can also be obtained by embodiment devices that include warped transducer elements or transducer elements with protrusions, for example. Embodiments can significantly narrow radiation detection patterns in the XZ plane while maintaining small side lobes in radiation detection patterns in the YZ plane, for example.

Reshaping of the aperture (transducer shape) can allow further control of each channel's vertical beamwidth and beam pattern structure (i.e. the main lobe plus all side lobes). The connection of aperture shape, main lobe width, and side lobe locations and strength is known in the context of Fourier transforms. In signal processing, a time domain waveform can be filtered using windowing techniques together with the Fourier transform. In other applications such as radar, acoustics, and optics, a spatial Fourier transform (i.e. a beam pattern) occurs when an aperture sends (or receives) energy from the far field of the aperture. The beam pattern shape may be altered by altering the window shape. Thus, principles used in signal processing can similarly be used in radar, acoustics and optics, because they use similar mathematics.

To avoid conflict between the channels' center-to-center spacings, while also altering the window shape for each channel to affect each channel's beam pattern in a desirable way, taper shapes such as the Gaussian shape illustrated in FIG. 1C, for example, may be used. To prevent each channel from physically interfering with adjacent channels, the shapes can be warped such that each effective channel center vertical position is maintained for the needs of interferometry, while at the same time the shape and warping achieve the desired vertical beam pattern (main lobe width, plus side lobe control).

Embodiment devices that are warped, such as shown in FIG. 1C, have significant benefits in addition to devices that are not so shaped, even beyond the advantages of embodiment devices with rectangular shapes, as shown in FIG. 1B, for example. In FIG. 1B, the vertical aperture has center-to-center spacings to meet interferometer system needs, and it also provides control of the vertical beam pattern shape because it has a taller vertical span, thus allowing a narrower vertical beam. However, for some vertical angles, side lobes in the radiation pattern can increase. Warped configurations such as shown in FIG. 1C also provide a continuous aperture distribution, without spatial breaks, so that the side lobe radiation pattern structure will decrease. The Gaussian shape of the device in FIG. 1C also controls the location and level of side lobes in both vertical and horizontal planes. This is an additional benefit not obtained by either prior art devices, such as illustrated in FIG. 1A, nor embodiment devices having only split elements, as illustrated in FIG. 1B.

FIGS. 3A-3E and 5A-5E include examples of prior art transducer shapes and their corresponding radiation detection distributions for comparison purposes, while FIGS. 4A-E illustrate an example diamond element shape and corresponding radiation detection distributions for comparison purposes.

FIG. 3A illustrates the element shape for the rectangular element 102a shown in FIG. 1A. As illustrated in the graphs in FIG. 3A, the rectangular element shape 102a gives rise to a radiation detection amplitude distribution 344 in the X dimension, with another rectangular radiation detection amplitude distribution 346 in the Y dimension. These rectangular amplitude distributions 344 and 346 can also be termed "boxcar" distributions, as shown in FIG. 3B.

FIGS. 3B and 3C illustrate the relationship between the boxcar or rectangular amplitude distribution of a receiver or source and the far field polar radiation distribution. Namely, the amplitude distribution and far field radiation pattern are related by Fourier transform, as understood in the art of sonar transducer construction. The rectangular "boxcar" distribution 348 shown in FIG. 3B yields a far-field sinc radiation pattern 350, illustrated in FIG. 3C, when a spatial Fourier transform is performed. It should be noted that the amplitude distribution in 348 is shown as a function of time, and the Fourier transform leads to the temporal frequency distribution 350 shown in FIG. 3C. However, the relationship between a spatial amplitude distribution (such as the Y distribution 346) and the spatial frequency distribution, is the same, so the term spatial Fourier transform is used.

FIGS. 3D-E are graphs illustrating the X dimension and Y dimension polar radiation distributions, respectively, calculated by spatial Fourier transform and ray tracing for the element shape 102a. In particular, FIG. 3D is a polar graph illustrating a Y dimension polar radiation distribution 352 in the XZ plane illustrated in FIG. 1A, with 0° being centered on an axis normal to the transducer surface. The contours in the plot are in dB units. As can be seen in FIG. 3A and FIG. 3D, a relatively narrower X dimension amplitude distribution corresponds to a relatively wide radiation distribution 352.

FIG. 3E is a polar graph illustrating a Y dimension polar radiation distribution 354 in a plane intersecting the Y-axis illustrated in FIG. 2A. The highest side lobe 356 in the radiation pattern 354 reaches a level of −13 dB.

FIGS. 4A-E are similar to the FIGS. 3A-3E, except that the FIGS. 4A-E correspond to an existing diamond-shaped element 460 illustrated in FIG. 4A. The X amplitude distribution 444 and Y amplitude distribution 446 are triangular, and FIGS. 4B-C illustrate that a triangular amplitude distribution 448 corresponds to a sinc$^2$ frequency distribution 450. FIG. 4D shows the X dimension polar radiation distribution pattern 452 corresponding to the X dimension amplitude distribution 444 shown in FIG. 4A. FIG. 4E illustrates a Y dimension polar radiation distribution pattern 454 corresponding to the amplitude distribution 446 shown in FIG. 4A. The highest side lobe 456 for the Y distribution 454 reaches a level of −27 dB. While the side lobes of FIG. 4D (including the highest side lobe 456) are smaller than those of FIG. 3B for the Y dimension, the X dimension pattern 452 is wider than the corresponding pattern in FIG. 3D for the rectangular shape. Thus, FIGS. 4A and 4D illustrate that an arbitrary modification of the element shape 102 in FIG. 3A will not lead to helpful results as to narrowing the X dimension radiation pattern to make it more directive as desired.

Figures 5A, 5D, 5E:
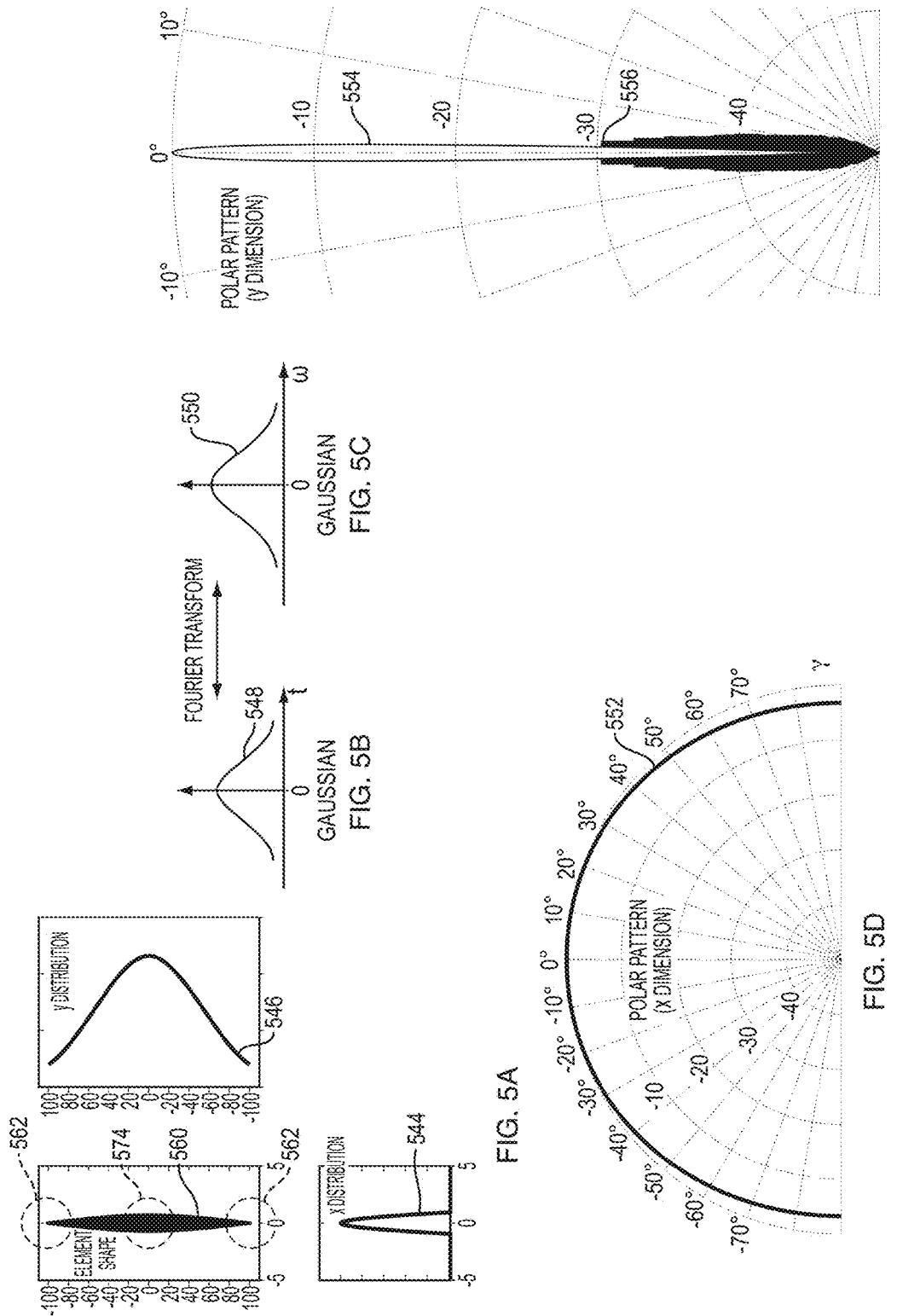

FIGS. 5A-E are similar to FIGS. 3A-E and 4A-E, except that FIGS. 5A-E correspond to a tapered element 560 illustrated in FIG. 5A. The general shape of the element 560 has been used to decrease side lobes in the Y dimension, as illustrated in FIG. 5E, as well as narrow the radiation distribution in the X dimension, as illustrated in FIG. 5D. The element 560, like the element 460 in FIG. 4A, has tapered ends 562. The tapered ends 562 are smaller in local width than a center section 574 of the element. While the ends 562 come to a point, in other embodiments, tapered ends do not come to a point. Thus, as used herein, "tapered" or "tapered ends" refers to ends of a transducer element having a smaller width than a center section of the transducer element. The element 560 has an X amplitude distribution 544 and a Y amplitude distribution 546. The Y amplitude distribution 546 has a largely Gaussian shape. As illustrated in FIGS. 5B-C, the Fourier transform of the Gaussian function 548 is also Gaussian function 550.

FIG. 5D shows an X dimension polar radiation pattern distribution 552 corresponding to the amplitude distribution 544 shown in FIG. 5A. FIG. 5E shows a Y dimension polar radiation distribution pattern 554 corresponding to the amplitude distribution 546 shown in FIG. 5A. It should be noted that, as shown in FIGS. 5B and 5C, a full Gaussian amplitude distribution corresponds to a full Gaussian radiation pattern with no side lobes. However, for any real implementation of an element, a Y amplitude distribution will be truncated, as shown in the Y distribution 546 in FIG. 5A. Thus, in real implementations, there will be side lobes in a Y radiation distribution, as shown in FIG. 5E, but the side lobes can be made very small, such as the highest side lobe 556 around −30 dB.

FIGS. 6A-C are used to show how the divided (split) elements 104a-c can be used to narrow X dimension polar radiation distribution patterns according to embodiments of the invention. FIGS. 6A-C also include shapes and graphs corresponding to the standard rectangular element shape 102a from FIG. 1A. The element 104a is divided into two spatially separated element portions that are electrically coupled to each other. This is in contrast to the standard element shape 102a, which is one, undivided structure. The electrical coupling between the element portions 104a can be done via an electrical circuit, for example, as illustrated in FIG. 12A, for example, which drives both element portions together or receives detected signals from the element portions 104a, treating them as a single element. Element portions 104a and FIG. 6A are equal in size, but in other embodiments, the element portions 104a are not equal in width. FIG. 6A also shows X dimension amplitude distributions 344 and 644, corresponding to the standard element 102a and divided element 104a, respectively. The rectangular element portions 104a are rectangular in shape and have longer sides oriented parallel to one another and also parallel to an axis along which the element 104a is divided, namely an axis parallel to the y axis and centered at zero along the x axis in FIG. 6A.

FIG. 6B illustrates X dimension polar radiation distribution patterns 352 and 652, corresponding to the amplitude distributions 344 and 644, respectively. As can be seen in FIG. 6B, one advantage of the divided element design is that it achieves some narrowing in the X dimension radiation pattern 652 compared with the pattern 352 for the standard element 102a. This corresponds to the wider overall X dimension amplitude distribution 644 achieved by dividing the element 104a into two portions. While the element 104a is divided into two portions, and other embodiments, the element is divided into three or more portions. The narrowing of the spectrum and 652 shown in FIG. 6B is particularly significant in the range between 40° and 60°.

FIG. 6C illustrates how three divided elements can be incorporated into a three-element transducer. Namely, in addition to the element portions 104a, other divided elements 104b and 104c are also used. FIG. 6C illustrates acoustic centers 668a-c corresponding to each of the standard elements 102a-c and each of the divided elements 104a-c. The acoustic center 668a, for example, is located between the divided element portions 104a, with the other acoustic centers 668b-c located between respective pairs of element portions 104b and 104c, respectively.

One advantage of the embodiment split elements 104a-c illustrated in FIGS. 6A and 6C is that separations between acoustics centers of the elements can be maintained, relative to the standard elements 102a-c, even while the X amplitude distribution is broadened relative to the standard element case. Thus, the separation 667a between the acoustic centers 668a and 668b is the same for the standard and divided elements of FIG. 6C. Similarly, the separation 667b between the acoustic centers 668b and 668c is the same for both the standard and divided elements of FIG. 6C. In some embodiments, such as the split-element design shown in FIG. 6C, at least one element portion of one transducer element is in physical contact with at least one element portion of another divided transducer element. In FIG. 6C, this is the case for one element portion of transducer element 104a and one portion of transducer element 104b.

Figure 7C:
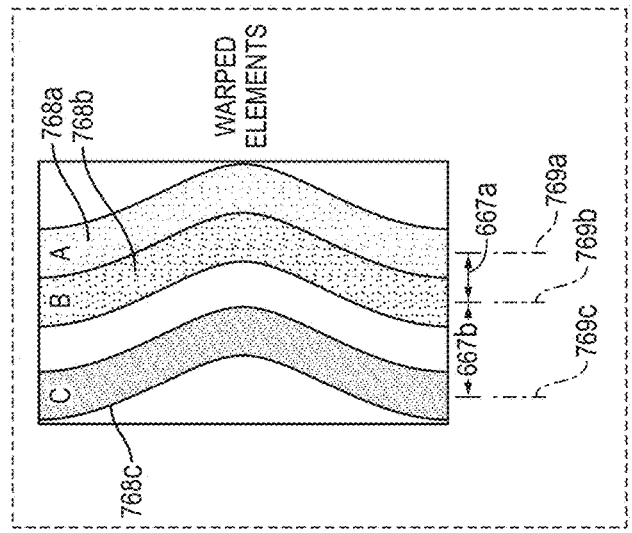
FIG. 7A-C include comparison illustrations similar to those of FIGS. 6A-C, respectively, for the prior art rectangular element shape compared with an embodiment warped element shape.
Figure 7B:
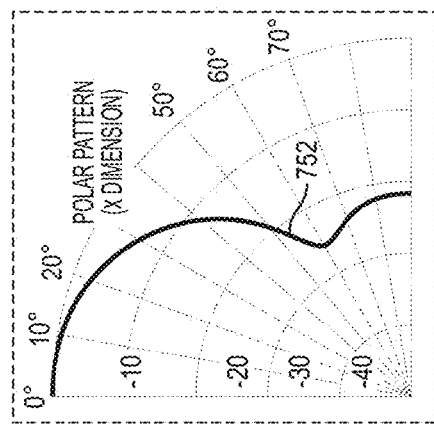
Figure 7A:
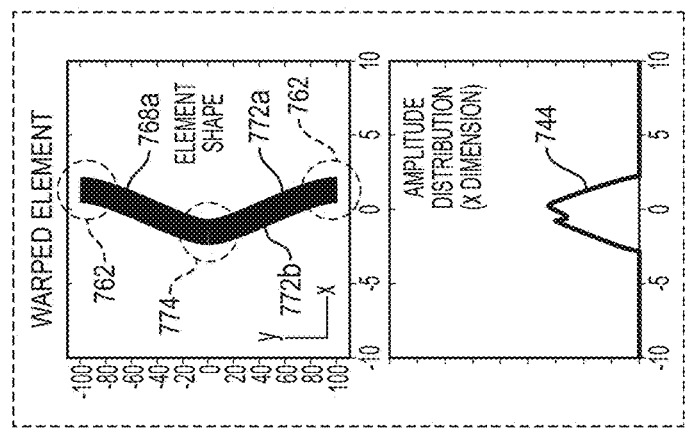

FIGS. 7A-C are similar to the right sides of FIGS. 6A-C, respectively. However, FIGS. 7A-C include illustrations corresponding to an embodiment warped element 768a shown in FIGS. 7A and 7C. FIGS. 7A-C can be compared and contrasted with the left sides of FIGS. 6A-C (corresponding to the standard rectangular element shape 102a from FIG. 1A), respectively.

As used herein, "warped" denotes an element shape that has an overall width greater than any local width of the element, as further illustrated in FIG. 8D. Warped elements can further lack inversion symmetry with respect to the Y axis, as illustrated in FIG. 8D. It should be understood that warping and tapering are two different characteristics. Tapered elements, as described hereinabove in conjunction with FIG. 4A, include elements with ends that are narrower (smaller in width) than a center portion of the element, while warped elements include those with an overall width greater than any local width of the element, as illustrated further in FIG. 8D. A warped element, such as the warped element 768a, contrasts with elements that are only tapered but not warped, such as the tapered element 560 in FIG. 5A, for example. It will be noted that the element 560 in FIG. 5A has inversion symmetry and has an overall width that is the same as the maximum local width. The element 768a includes two warped edges 772a and 772b at opposing sides 772a and 772b of the radiative surface of element 768a. Each of the warped edges has the same shape, with the shape having the same function parameters. The element 768a is not tapered; namely, ends 762 have widths equal to the width of the center portion 774. However, in other embodiments, such as the embodiment shown in FIG. 8A, warped elements are also tapered. Further, in some embodiments, such as 106a-c, each tapered end comes to a point, joining the two warped edges at each tapered end. Furthermore, in other embodiments, the edges 772a and 772b have different functional shapes. For example, in one embodiment, the edges 772a and 772b have shapes described by similar functions but with different functional parameters. In yet other embodiments, one edge has one functional shape, while the other edge has a different functional shape.

An X dimension radiation amplitude distribution 744 for the element 768a is broader than the corresponding X dimension amplitude distribution 344 for the rectangular element 102a. The broader amplitude distribution 744 leads to a corresponding narrower X dimension polar radiation pattern 752 in FIG. 7B. FIG. 7C illustrates how the warped element 768a can be used with similar warped elements 768b-c for use in a three-element transducer. Because the elements 768a-c are warped, the corresponding dashed lines 769a-c do not represent acoustic centers of the elements, as the dashed lines 668a-c do for the standard elements 102a-c. Acoustic centers (not shown) for the elements 768a-c would be shifted to the right of the dashed lines 768a-c, respectively. However, the separations 667a and 667b between adjacent element 768a-b and 768b-c, respectively, do represent the relative separation between acoustic centers of the adjacent warped elements. Thus, the acoustic centers (not shown) for the warped elements 768a-c can have the same spacing as the standard rectangular elements 102a-c.

FIGS. 8A-D pertain to an embodiment transducer element 860, shown in FIG. 8A. The element 860 is tapered, because it has ends 862 smaller in width than a center portion 874 of the element. Two edges 872a and 872b of the elements both have substantially similar shapes, but the shape of the edge 872a follows a shallower curve than the edge 872b. The edges 872a-b are edges of a radiative surface 864 of the element 860. The element 860 has a substantially Gaussian Y amplitude distribution 846 and an X distribution 844. X and Y dimension polar radiation distributions 852 and 854, respectively, are illustrated in FIGS. 8B and 8C, respectively. The Gaussian Y amplitude distribution 846 is truncated, as further described hereinabove in relation to FIG. 5A.

FIG. 8D illustrates that warped elements are defined, as used herein, as having an overall width of a radiative surface of the element being greater than any local width of the radiating surface of the element. In FIG. 8D, for example, an overall width 873 is greater than any of the local widths 863a-c. Other example transducer elements that are warped and share this characteristic of overall width include the elements 768a-c (see FIGS. 7A and 7C) and elements 1202a-c, 1203a-c, and 1205a-c (described hereinafter in conjunction with FIGS. 12A, 12B, and 12C, respectively).

Warped edges of a transducer element are edges on opposing sides of a radiative surface of a transducer element that define shapes that result in the transducer element being warped. For example, the warped edges 872a and 872b (illustrated in FIG. 8A) are edges on opposing sides of the element 860 that define shapes causing the element 860 to be warped (having an overall width of the radiative surface of the element that is greater than any local width of the radiative surface of the element). Some warped edges define shapes that are not smooth. Furthermore, some warped edges define shapes that are periodic, with warped sawtooth or other warped periodic edges with periodic elongations, for example. One example is described hereinafter in conjunction with FIG. 12C. In FIG. 12C, a sawtooth edge 1284 and smooth edge 1213a are warped edges and define a warped element 1205a having periodic elongations from the sawtooth edge 1284.

FIG. 8D also illustrates that warped elements can lack of inversion symmetry. For example, the element 860 is shown on the left, while a mirror image 860' of the element is shown on the right side of the Y axis illustrated in FIG. 8D. It should be noted that some elements, such as elements 110 (see FIG. 1E) and 1110a (described hereinafter in conjunction with FIG. 11B), similarly lack inversion symmetry. However, elements 110 and 1110a are not warped because they do not have an overall width of a radiative surface greater than any local width of the same radiative surface of the same element.

Figure 9:
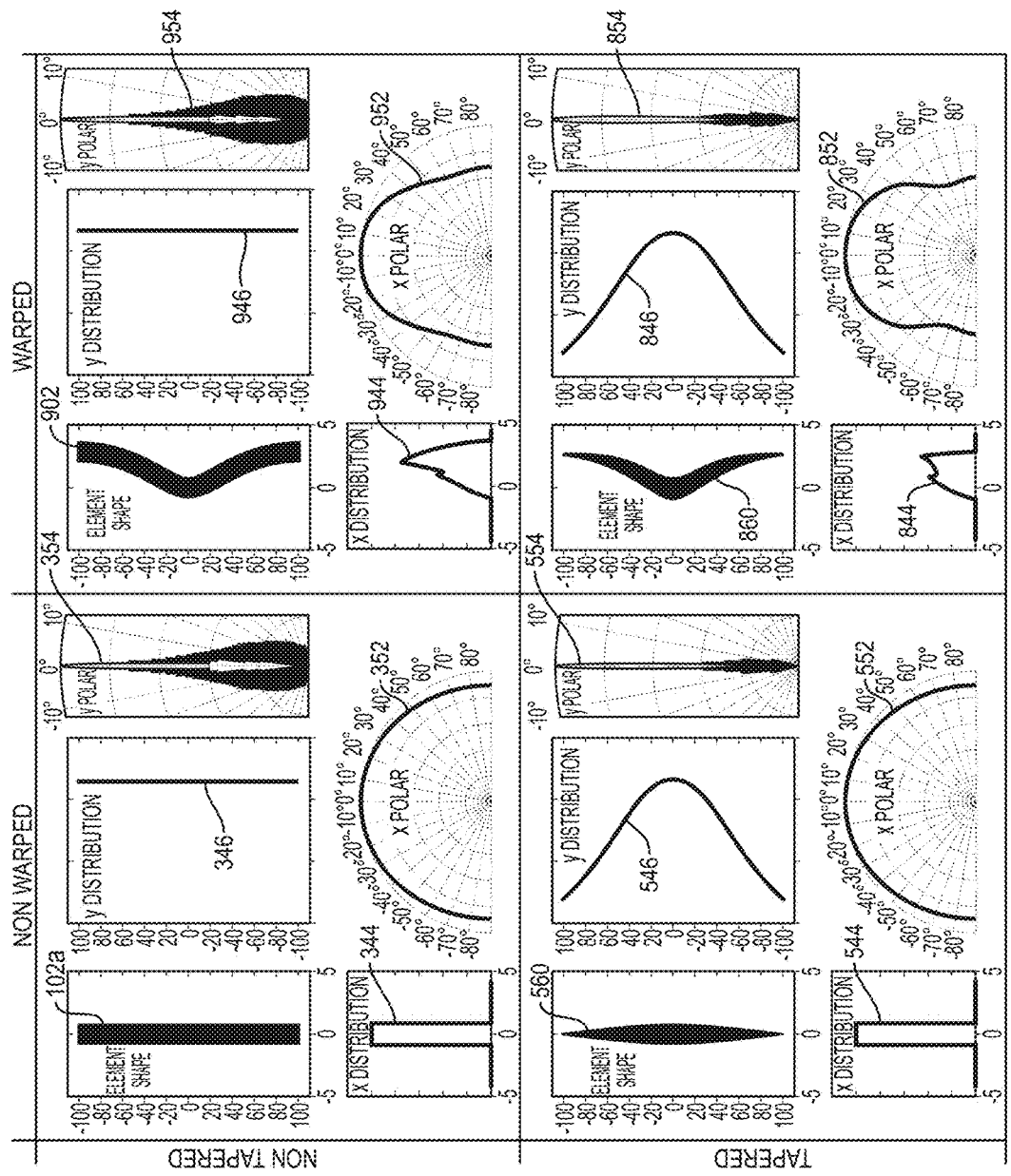
FIG. 9 illustrates the effects of warping and tapering transducer element shapes upon the amplitude distributions and radiation patterns.

FIG. 9 illustrates effects of tapering and warping elements on X and Y amplitude distributions and X and Y polar radiation distributions. In particular, non-warped elements 102a and 560 are shown on the right of FIG. 9, while warped elements 902 and 860 are shown on the right of FIG. 9. The elements 102a and 902 at the top of FIG. 9 are not tapered, while the elements 560 and 860 at the bottom of FIG. 9 are tapered.

The upper left of FIG. 9 illustrates the rectangular element shape 102a, X and Y amplitude distributions 344 and 346, respectively, and X and Y polar radiation distributions 352 and 354, respectively, as also illustrated in FIGS. 3A, 3D, and 3E. In contrast to the rectangular element 102a, the element 902 in the upper right of FIG. 9 is warped. While a Y amplitude distribution 946 and Y polar radiation pattern 954 are not substantially different from those of the standard element 102a, an X amplitude distributional 944 is substantially broader than the X distribution 344 for the rectangular element 102a, and an X polar radiation distribution 952 is substantially narrower than the distribution 352 corresponding to the rectangular element.

The tapered element 560 at the bottom left of FIG. 9 has a broader Y amplitude distribution 546 and narrower Y axis polar radiation distribution 554 compared to the Y distribution 346 and Y radiation distribution 354 for the standard element shape. However, an X amplitude distribution 544 corresponding to the tapered element 560 is overall narrower than the X amplitude distribution 344 for the standard element 102a. Furthermore, an X polar radiation distribution 552 corresponding to the tapered element 560 is broader than the X radiation distribution 352 for the standard element. This illustrates that tapering alone may not necessarily narrow X radiation patterns, as desired for increased directionality in acoustic receivers, as described hereinabove. The element shape 860 at the lower right of FIG. 9 and is the same element illustrated in FIG. 8A. Notably, the X polar radiation distribution 852 is even narrower than the corresponding distribution 952 for the element 902 that is only warped. Furthermore, the wide polar distribution 854 has significantly smaller side lobes than the corresponding Y polar radiation distribution 954 for the element 902 that is only warped. In particular, the X polar radiation distribution is attenuated to a level of about −20 dB for arrival angles steeper than about +/−60°. Thus, warping elements can provide significant advantages in directivity of sonar transducer elements, and tapering in addition to warping can provide yet further advantages in narrowing the distributions.

Figure 10A:
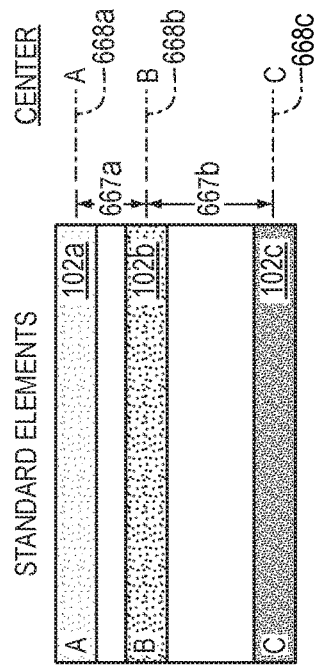
FIG. 10A illustrates a spacing between acoustics centers for the prior art transducer elements illustrated in FIG. 1A.
Figure 10B:
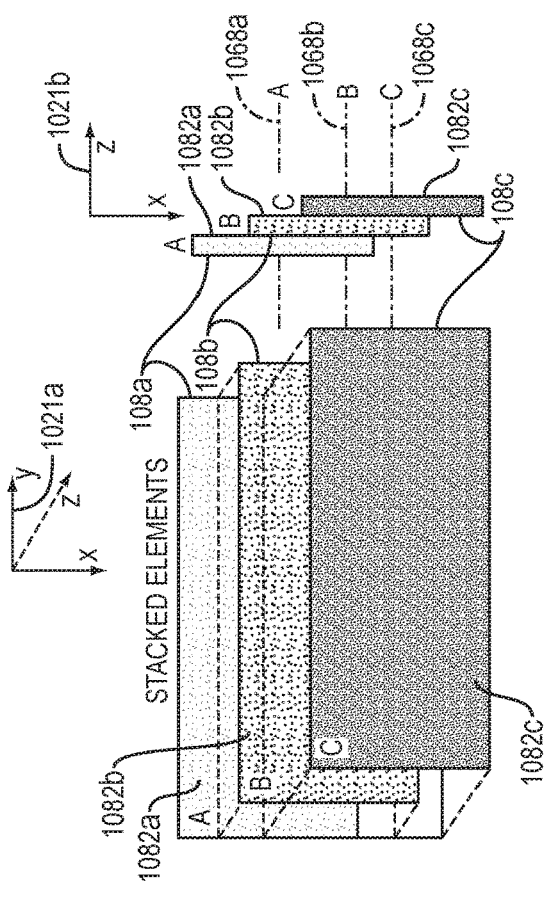
FIGS. 10B-C illustrate stacked transducer elements.
Figure 10C:
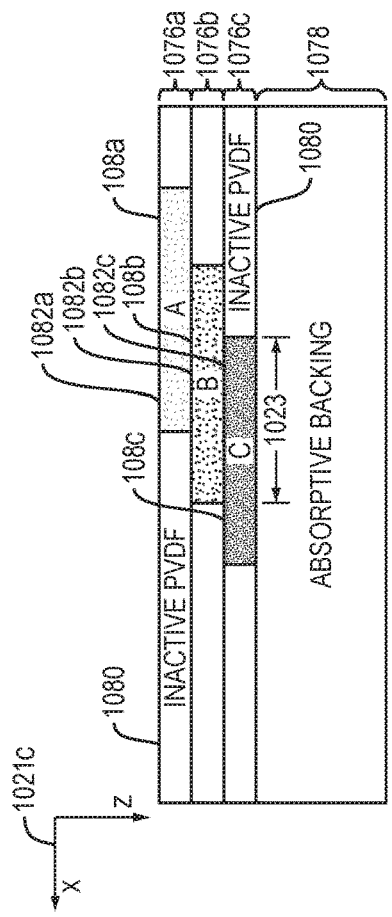

FIGS. 10A-C illustrate how transducer elements can be stacked to increase sensitivity and decrease X axis polar radiation distributions. FIG. 10A illustrates the rectangular elements 102a-c for comparison with stacked elements 108a-c illustrated in FIG. 10B. While rectangular stacked elements are illustrated in FIGS. 10B-C, the stacking principles illustrated can apply to many embodiments described herein that use non-rectangular element shapes. For example, FIG. 12E illustrates warped elements that have the additional advantages of stacking, as described hereinafter. The coordinates 1021a apply to the stacked elements on the left of FIG. 10B. The right side of FIG. 10B, to which coordinates 1021b apply, show and end-on view of the stacked elements 108a-c. FIG. 10C, to which coordinates 1021c apply, is a rotated and on view of the stacked elements 108a-c.

The elements 108a-c are much wider than the standard elements 102a-c of FIG. 10A. As understood by those skilled in the art of acoustic transducer design, widening the transducer elements in the X direction significantly narrows the corresponding radiation pattern in the XZ plane. Furthermore, widening the transducer elements can also increase transducer sensitivity and increase signal-to-noise ratios. However, any widening of the standard elements 102a-c is limited by potential physical interference between the elements. However, in accordance with embodiments of the invention, transducer elements can be stacked to allow increased size and overlap between the elements.

While FIG. 10B shows three stacked elements 108a-c, in other embodiments there are only two stacked transducer elements. Furthermore, while the stacked elements 108a-c are rectangular, in other embodiments, stacked transducer elements can have other shapes, as further illustrated in FIGS. 12B, 12D, and 12E, for example. Furthermore, there is flexibility in spacing of acoustic centers of the stacked elements. Acoustic centers 1068a-c, shown at the right of FIG. 10B, correspond to respective stacked elements 108a-c. Because the elements 108a-c are stacked, the spacing (not shown) between the acoustic centers 1068a-c can be the same as the spacings 667a-b shown in FIG. 10A for the standard elements, for example. FIG. 10B also illustrates acoustic radiative surfaces 1082a-c corresponding to each of the transducer elements 108a-c, respectively.

FIG. 10C illustrates how the example stacked elements 108a-c can form part of stacked polyvinylidene difluoride (PVDF) layers 1076a-c, respectively. Inactive portions 1080 of the PVDF layers 1076a-c are not configured to produce or detect acoustic radiation. In contrast, the stacked elements 108a-c, corresponding to active portions of the PVDF layers 1076a-c, are configured to generate and/or detect acoustic radiation. The active portions (stacked elements) of the PVDF layers 1076a-c can be defined, for example, by thin conductive layers deposited onto intended active portions 108a-c of the PVDF layers 1076a-c. Such deposited conductive layers are not shown as in FIG. 10C but are further illustrated in FIGS. 13A-B.

Most sound waves travel through PVDF. PVDF has an acoustic impedance close to that of water. Water has an acoustic impedance of approximately 1.5 MegaRayleighs (MRayls), while PVDF has an acoustic impedance of approximately 1.2 MRayls. This property enables each of stacked PVDF elements to react to incident acoustic radiation. In contrast, lead zirconium titanate (PZT) ceramic transducers reflect a very high percentage of incident sound waves, with an acoustic impedance of approximately 30 MRayls. Thus, PVDF layers, for example, can greatly facilitate maintaining sensitivity of stacked transducer elements. Furthermore, while a certain amount of reflection and absorption loss may be expected at each stacked element, losses can be calibrated and offset by calculations in a processor, for example. This is true even where reflection or absorption loss is different for each layer.

The PVDF layers 1076a-c in FIG. 10C are supported by an absorptive backing layer 1078. As sound waves pass through the PVDF layers, they will generally be reflected from a backing material and combined with incident sound waves. The impedance of the backing layer determines the polarity of the reflected sound waves, and reflection polarity and half length determine how the reflected and incident sound waves will combine (i.e. constructively or destructively). Furthermore, because path lengths to the backing material can be different for each PVDF layer, sound wave reflections can combine with incident sound waves differently for each PVDF layer. To solve this problem, the backing layer 1078 can be designed to be absorptive to minimize reflections from the backing. In particular, backing materials with high internal damping (e.g., sorbothane and some types of rubber) and acoustic impedance is close to that of PVDF can be used for the absorptive backing 1078.

Acoustic radiative surfaces 1082a-c corresponding to respective transducer elements 108a-c have some overlap with each other in the X direction. For example, in overlap 1023 is indicated in FIG. 10C between acoustic radiated surfaces 1082b and 1082c of elements 108b and 108c, respectively.

FIG. 11A illustrates the interdigital transducer elements 110a-c of FIG. 1E. In the embodiment of FIG. 11A, the periodic elongations 186a of element 110a are offset in the Y direction from the periodic elongations 186b of the element 110b. Furthermore, the periodic elongations 186a-b are of equivalent shapes such that the periodically elongated edge of the element 110a and the periodically elongated edge of the element 110b form a common edge 184 when the elements 110a and 110b are fit against each other. While the embodiment transducer of FIG. 11A includes an additional third element 110c with periodic elongations 186c, in other embodiments, there are only two transducer elements. An example of this is illustrated further in FIG. 11B, which is described hereinafter. The periodic elongations 186a-c of the elements 110a-c widen the x-axis amplitude distributions of the elements, which narrows the X polar radiation distributions of the elements. Furthermore, the spacing between X axis acoustic centers (not shown in FIG. 11A) of the elements 110a-c can be maintained while the X axis amplitude distributions are broadened. An electrical drive circuit (illustrated in FIG. 12A) can be configured to drive the transducer elements 110a-c at the same frequency if desired. Furthermore, the electrical circuit can be configured to drive the different transducer elements 110a-c with mutually distinct phases, if desired, to steer the transmitted beam in the XZ axis. In some embodiments, separate transducers (not shown) are used to transmit acoustic radiation, while the elements 110a-c are used only for detection of acoustic radiation.

FIG. 11B illustrates an embodiment transducer including two transducer elements 1110a and 1110b. The transducer element 1110b is rectangular, while the adjacent element 1110a has sinusoidal periodic elongations 1186d. Thus, as illustrated in FIGS. 11A and 11B, acoustic transducers can have acoustic radiative surfaces with periodic elongations having a variety of shapes. For example, periodic elongations can be sawtooth shaped, as illustrated in FIGS. 12C-D.

FIGS. 12A-E illustrate that embodiments can include transducers having transducer elements with more than one of the characteristics of being warped, divided, stacked, and having periodic elongations.

FIG. 12A illustrates transducer elements 1202a-c that are both warped and divided (split). The element portions 1202a, for example, are spatially separated but electrically coupled to each other. In the embodiment of FIG. 12A, an electrical circuit 1215 is configured to provide the same electrical drive signal 238 to the element portions 1202a, thus electrically coupling the element portions 1202a. In other embodiments, an electrical circuit can be configured to process signals collected by the element portions 1202a when incident radiation is detected. In other embodiments, there is an electrical junction connecting the two element portions 1202a. In each case, an electrical circuit electrically couples the two spatially separated element portions 1202a together, and electrical coupling as used herein should be understood to include using any means to treat spatially divided element portions such as the element portions 1202a as a single element for purposes of transmitting or detecting acoustic radiation. The elements 1202a-c are warped, as described in conjunction with FIGS. 7A, 8A, and 8D. Furthermore, the divided elements 1202a and 1202b are interleaved with one another because one element portion 1202b is situated between the element portions 1202a.

FIG. 12B illustrates a transducer configuration with transducer elements 1203a-c that are both warped and stacked. The elements 1203a-c are warped in accordance with the definitions provided in FIGS. 7A, 8A, and 8D. In particular, a lower edge 1225 indicates that the acoustic radiative surface of the element 1203a overlaps with the acoustic radiated surface of the element 1023b. Thus, in the embodiment of FIG. 12B, the benefits of both warping and stacking, as described herein above, can be obtained.

FIGS. 12C-D illustrate embodiment transducers having transducer elements with periodic elongations protruding from acoustic radiative surfaces of the elements. Elements 1205a-c of the embodiment in FIG. 12C have sawtooth shaped periodic elongations, including the periodic elongations 1286a of the radiative surface of element 1205a. But the periodic elongations of elements 1205a-b are offset from one another along the X direction such that when the elements 1205a and 1205b are brought together, they are shaped to form a common edge 1284. Furthermore, each of the elements 1205a-c includes a warped edge 1213a-c, respectively, on an opposing side of the transducer element from the edge with periodic elongations. Thus, the embodiment of FIG. 12C can be used to obtain the benefits of both warping, as described in FIGS. 7A-C and 8A-D, for example, and also periodic elongations, as described in FIGS. 11A-B, for example.

FIG. 12D illustrates transducer elements 1207a-c that both have periodic elongations and are stacked to obtain the benefits of both configurations. Periodic elongations 1286b of the transducer 1207b, for example, are sawtooth shaped.

A lower edge 1288 of the element 1207a illustrates how radiative surfaces of the elements 1207a and 1207b are configured to overlap.

FIG. 12E illustrates transducer elements 1209a-c that are warped, tapered, and overlapping. In particular, each of the transducer elements 1209a-c is similar to the transducer element 860 illustrated in FIG. 8A, in that the elements 1209a-c each include two warped edges on opposing sides of the transducer. Each of the elements 1209a-c has two tapered ends 1262 that are smaller than center portions (e.g., see FIG. 8A) of the respective elements 1209a-c. The lower edge 1288 of the element 1209a illustrates how the elements 129a and 129b are configured to overlap. An electrical circuit 1215 is configured to receive respective acoustic radiation signals 1227a and 1227b from the transducers 1209a-b and to detect the phase difference between the received signals to perform interferometric sonar measurements, as described in conjunction with FIGS. 2D-M.

Although not shown in FIG. 12E, the electrical circuit 1215 can also be configured to receive transducer signals from element 1209c and or to drive elements 1209a-c to produce acoustic radiation. Drive signals (not shown) can be configured to drive the elements 1209a-c at the same frequency to produce acoustic radiation. The elements 1209a-c can also be driven with the same electrical phase, or with mutually distinct electrical phases to steer transmitted radiation, as understood in the art of acoustic transducers.

Figure 12F:
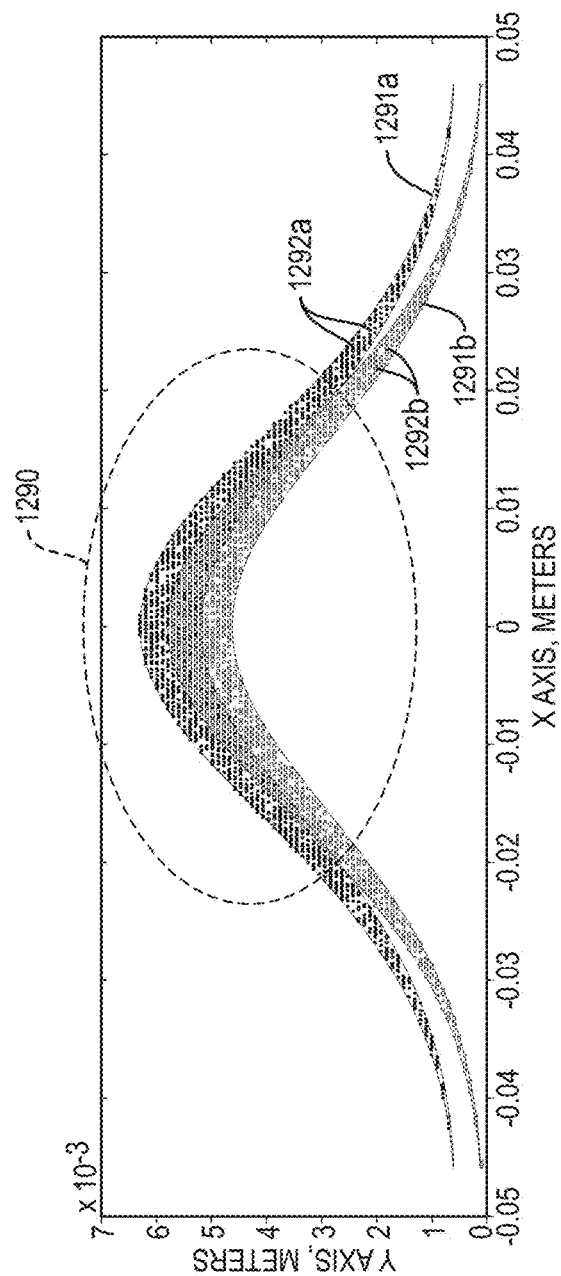
FIG. 12F is a graphical illustration of an embodiment set of transducers with non-contiguous sub-elements interspersed with each other in the same plane.

FIG. 12F is a graphical illustration of an embodiment set of transducers with non-contiguous sub-elements interspersed with each other in the same plane. In particular, a first transducer element 1291a includes a plurality of sub-elements 1292a that, together, form the overall shape of the warped element 1291a. The sub-elements 1292a can be formed by using printed circuit board technology, for example, to electroplate small areas of a PVDF surface, for example. The sub-elements 1292a can be non-contiguous with each other such (spatially separated from each other) and yet electrically coupled to each other by using printed circuit board technology or wire boding technology, for example, as will be understood by those skilled in those respective arts. The sub-elements 1292a can collectively cover a percentage of the overall area of the element 1291a, such as 50%, 40%, 30%, 20%, or 10%, for example The embodiment of FIG. 12F also includes a second transducer element 1291b occupying a common surface with the element 1291a. In particular, the element 1291b is in the same plane as the element 1291a. The element 1291b includes a plurality of sub-elements 1292b that, together, form the overall shape of the warped element 1291b. The sub-elements 1292b are non-contiguous, similar to the sub-elements 1292a.

The elements 1291a and 1291b overlap each other in an overlap region 1290, where the sub-elements 1292a and 1292b occupy the same plane. As described hereinabove, the sub-elements can occupy overall, for example, only 40% of the respective areas of the respective transducer elements, such that the sub-elements 1292a do not physically contact the sub-elements 1292b and are also electrically isolated from the sub-elements 1292b.

Thus, the embodiment of FIG. 12F illustrates another configuration that can be used to bring transducer elements closer together to avoid aliasing, while avoiding any need for stacking elements, as illustrated in FIG. 1D, for example.

Figure 13A:
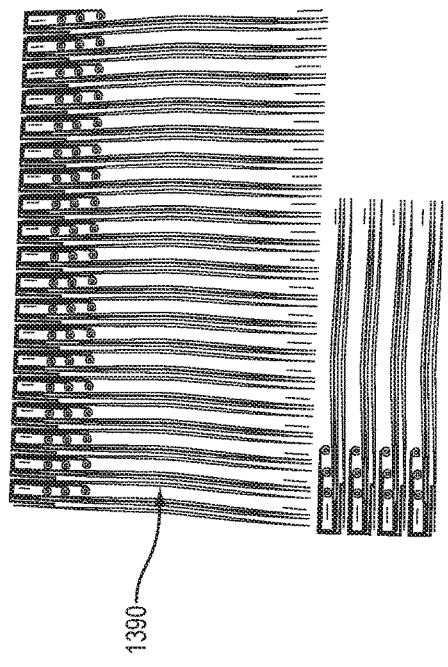
FIGS. 13A-B are line drawings showing embodiment warped, tapered transducer elements printed onto a sheet of polyvinylidene difluoride (PVDF) for prototyping.
Figure 13B:
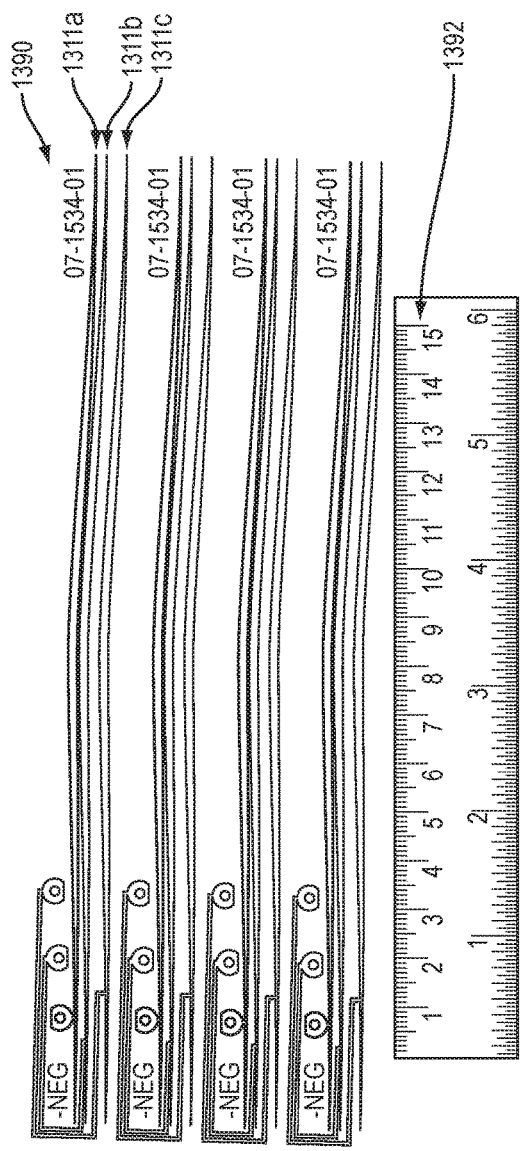

FIGS. 13A-B illustrate an additional advantage of embodiments of the invention, namely that transducer elements can be printed onto a sheet of PVDF 1390 by depositing a metallic layer, for example. FIGS. 13A-B include warped, tapered elements 1311a-c. The elements 1311a-c are similar to the warped elements 106a-c illustrated in FIG. 1C, except that the curve functions representing the top and bottom edges on opposing sides of the radiative surfaces of the elements 1311a-c are shallower and broader than functions corresponding to the warped elements 106a-c of FIG. 1C. A ruler 1392 is shown in the photograph of FIG. 13B for size perspective.

In the embodiment shown in FIG. 13B, the three warped and tapered elements 1311a-c are plated onto the sheet 1390 of PVDF on only one side of the sheet, and only in the regions intended to constitute active elements 1311a-c. Furthermore, as illustrated in FIGS. 13A-B, multiple transducer elements can be plated onto a single sheet of PVDF, providing efficiency and ease of manufacture. Other characteristics and advantages of PVDF are described hereinabove in the description of FIG. 10C. One advantage of PVDF elements is that they can form part of PVDF layers that can be easily stacked for embodiment transducers including stacked elements. Stacked elements can include rectangular elements, as shown in FIGS. 10B-C, warped elements, as shown in FIGS. 12B and 12E, and elements with periodic elongations such as sawtooth elements, as illustrated in FIG. 12D, for example. In addition, as described hereinabove, PVDF enables transducer elements to be manufactured more easily and efficiently. While all or most of the transducer and elements described herein above can be ceramic elements, such as piezoelectric transducers (PZTs), or capacitive transducer elements, many of the element shapes described herein above are complex and can be most easily manufactured by printing corresponding transducer patterns on sheets of PVDF, such as that shown in FIGS. 13A and 13B.

In other embodiments, electrostrictive transducer elements, for example, can be used in place of PVDF. For example, the warped elements of FIGS. 1, 7A, 7C, 8A, 5A, 12B, 12C, and 12E, for example, can be more easily fabricated from PVDF sheets than from ceramic, capacitive, or electrostrictive materials. Furthermore, transducer elements with tapered ends, such as those illustrated in FIGS. 4A and 8A, for example, and transducer elements with periodic elongations, such as those of FIGS. 11A, 12C, and 12D, for example, can be fabricated more easily from PVDF with metallic deposits thereon.

FIG. 13C is a model illustrating how transducers such as those illustrated in FIGS. 13A-B can be configured for side-scan applications with through-hull mounting, for example. A threaded post 1313 is configured to be inserted through the hull of a watercraft such as the watercraft 218 illustrated in FIG. 2E, for example. Attached to the post 1313 is a backing surface 1315. A three-element PVDF transducer including the active transducer elements 1311a-c are mounted. Although not illustrated in FIG. 13C, the backing surface 1315 and transducer elements 1311a-c can be encapsulated with polyurethane, for example. In other embodiments not illustrated, other mounting configurations may be used.

Figure 13D:
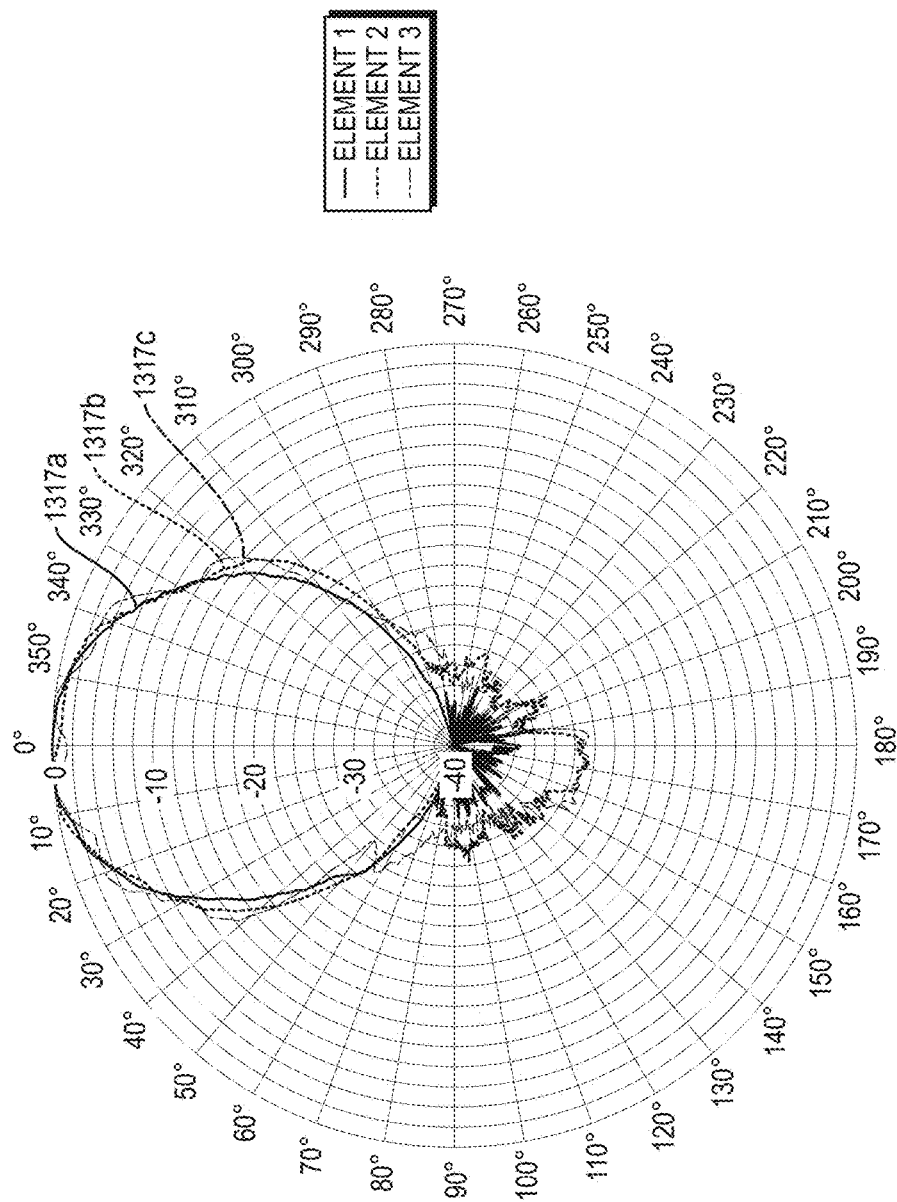
FIG. 13D is a graph illustrating measured beam patterns in the width (x) dimension for a prototype device constructed using the warped elements shown in FIGS. 13A-B.

FIG. 13D is a graph illustrating measured beam patterns in the width (x) dimension. The measurements are from a prototype device built using the PVDF elements shown in FIGS. 13A and 13B. In particular, measured curves 1317a-c are measured radiation patterns for the transducer elements 1311a-c, respectively. The corresponding modeled beam pattern for this type of element is illustrated by the curve 852 in FIG. 9. Specifically, curve 852 is the predicted beam pattern in the width dimension. The measured beam patterns 1317a-c are similar the predicted curve 852 but slightly narrower than the model. This is not unexpected because the modeled pattern illustrated at 852 in FIG. 9 does not account for the effects of housing diffraction or the backing of the PVDF.

Figure 14A:
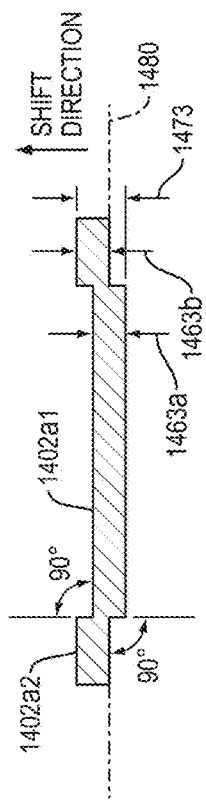
FIGS. 14A-B illustrate warped transducer elements with edges defining 90° angles.
Figure 14B:
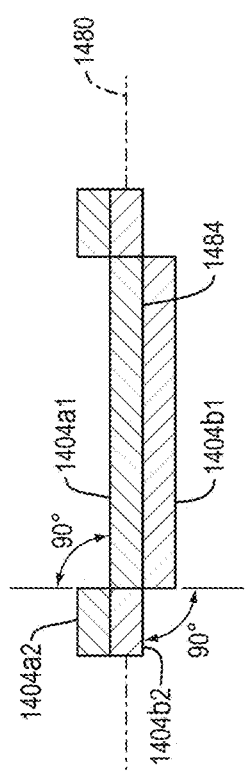

FIGS. 14A-B illustrate warped transducer elements with edges defining 90° angles therein. In particular, FIG. 14A illustrates an element 1402a having a top edge with a 90° angle therein and a bottom edge with a 90° angle therein. A second (shifted) portion 1402a2 of the element 1402a can be referred to as a protrusion of the element 1402a with respect to a first portion 1402a1 of the element. The shifted portion 1402a2 results in the 90° angles in the top and bottom edges of the element 1402a. The element 1402a is warped because an overall width 1473 of the element is greater any local width such as local widths 1463a-b. In other embodiments, one or more similar elements (1402b, 1402c, etc., not shown) with similar shape can be placed adjacent to each other in the same geometric orientation. In yet other embodiments, there are angles other than 90° in the top and bottom edges of element 1402a.

FIG. 14B illustrates two elements 1404a and 1404b. The element 1404a has two element portions 1404a1 and 1404a2 that share a corner, and the element 1404b has two similar element portions 1404b1 and 1404b2. The elements 1404a-b are also warped, and they can be placed adjacent to each other and even form a common edge 1484 as shown. Thus, two or more elements such as elements 1404a and 1404b can be used to form a "checkerboard" pattern of elements. In each of the elements 1402a, 1404a, and 1404b illustrated in FIGS. 14A and 14B, respectively, the second portion of each element is shifted with respect to the first element portion in a direction perpendicular to a major axis 1480 of a transducer element to form the 90° angles in the top and bottom edges of the elements.

Figure 14C:
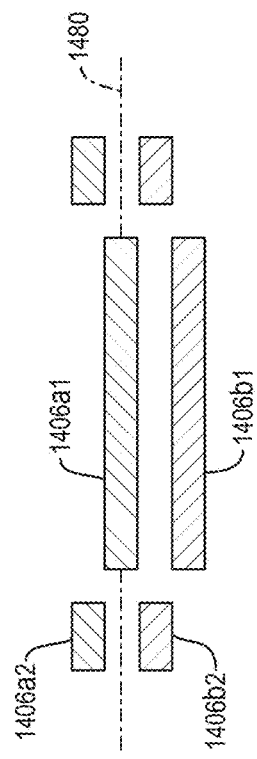
FIG. 14C illustrates a transducer element with element portions spatially separated and offset from one another.

FIG. 14C illustrates two elements 1406a and 1406b that can form part of an acoustic transducer device. The first transducer element 1406a is divided into first and second spatially separated element portions 1406a1-2, which are electrically coupled to each other in a matter described hereinabove in conjunction with FIGS. 12A and 12E, for example. The second transducer element 1406b is also divided into first and second spatially separated element portions 1406b1-2 electrically coupled to each other. The second element portions 1406a2 and 1406b2 of the first and second transducer elements are spatially offset from the first element portions of the first and second transducer elements, respectively, in a direction perpendicular to a major axis 1480 of the respective first transducer element.

It should be noted that in the embodiment illustrated in FIG. 14C, the second element portions 1406a2 and 1406b2 are also spatially offset from the first element portions 1406a1 and 1406b1, respectively, in a direction parallel to the major axis 1480. However, in other embodiments, the second element portions are shifted only in the direction perpendicular to the major axis 1480.

FIGS. 15 and 16 illustrate warped transducer elements 1502 and 1602, respectively, each of which has a respective radiative surface defining periodic protrusions at opposing sides of the transducer. Element 1502 has two sawtooth edges with protrusions that are aligned with each other (see an alignment axis 1590, for example) instead of being offset from one another. Thus, element 1502 is warped, because an overall width 1573 is greater than any local width such as local widths 1563a-b. The warped sinusoidal transducer element 1602 in FIG. 16 has two sinusoidal edges with protrusions that are aligned with other (see an alignment axis 1690, for example) instead of being offset from each other.

Element 1602 is similarly warped because an overall width 1673 is greater than any local width such as local widths 1663*a-b*.

Figure 17C:
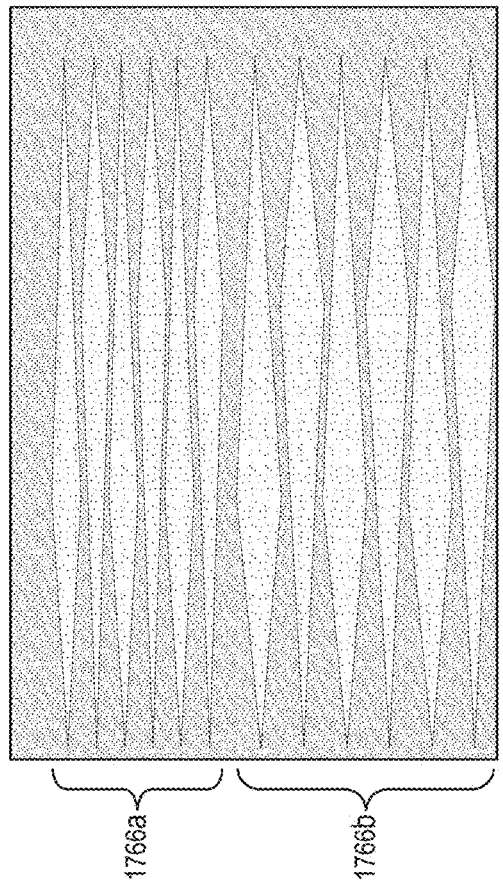
FIGS. 17A-C illustrate various acoustic transducers having one or more transducer elements with acoustic radiative surfaces with skewed diamond shapes.
Figure 17A:
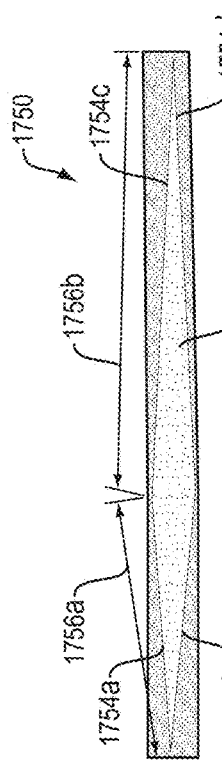

FIG. 17A is a diagram illustrating an acoustic transducer element 1750 with an acoustic radiative surface 1752 that has a skewed diamond shape. As used herein, "skewed diamond shape" is used to describe a transducer element that has four straight sides that are not all equilateral. In particular, the four different sides have respective side lengths of at least two different values. Furthermore, the skewed diamond shapes illustrated herein have at least three different angle sizes for angles between respective sides of the transducer elements.

For example, the transducer element 1750 has sides 1754*a-b* that share a common side length 1756*a*. The element 1750 also has sides 1754*c-d* that share a common side length 1756*b*, but the side length 1756*b* is longer than the side length 1756*a*. In contrast to the skewed diamond shape of the element 1750, the element 460 in FIG. 4A is diamond-shaped but not skewed. In particular, the diamond shape 460 in FIG. 4A has four sides that are all equilateral.

Transducer elements with skewed diamond shapes as illustrated in FIG. 17A can be made from any of the transducer types described hereinabove. However, it is particularly advantageous to make these transducer elements from PVDF material. As described hereinabove in relation to FIGS. 13A-B, printed circuit board-related technology can be used to define elements on a sheet of PVDF by printing the electrodes in the desired shape. This technology can enable multiple transducer elements to be placed on a single sheet. This has benefits associated with ease of manufacturing and also of placement of multiple transducer elements in proximity with each other for interferometric transducer designs, as described further hereinafter in connection with FIGS. 17B-C.

Figure 17B:
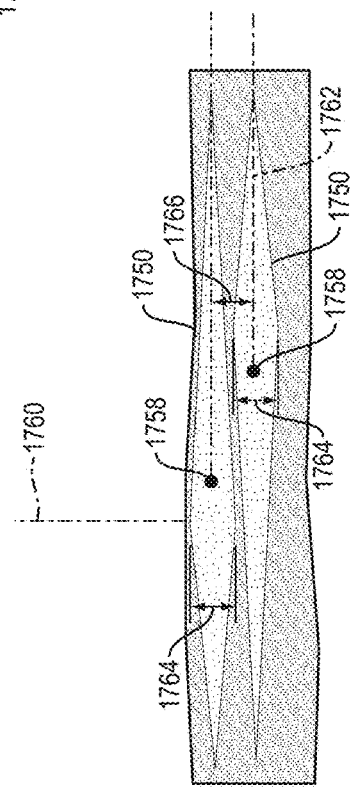

FIG. 17B illustrates two skewed diamond-shaped transducer elements 1750 placed in close proximity with each other. This configuration illustrates a significant advantage of skewed diamond-shaped transducer elements. In particular, these elements are advantageous for interferometric transducers because they can be placed with their acoustic centers closer together than for the non-skewed diamond shapes. The advantages of having acoustic centers relatively closer together for interferometric designs have been described hereinabove.

In FIG. 17B, the two skewed diamond transducers 1750 each have a width 1764 in the direction of a short axis 1760 of the transducers. It will be understood that, if a two-element transducer were hypothetically formed of two non-skewed diamond-shaped elements, such as the element 460 illustrated in FIG. 4A, a separation between acoustic centers of the respective, non-skewed diamonds would need to be greater than a width along a short axis of the diamond element 460 to prevent physical and electrical interference between the two elements. However, as illustrated in FIG. 17B, the two skewed diamond elements 1750 can be placed in close proximity with opposite orientations along the long axis 1762 of the elements. This enables a center-to-center separation 1766 between the acoustic centers 1758 to be smaller than the width 1764 of the transducer elements along the short axis 1760.

FIG. 17C illustrates two groupings 1766*a* and 1766*b* of skewed diamond-shaped transducer elements. These groupings of transducer elements illustrate that transducers may comprise more than two skewed diamond-shaped transducer elements. Furthermore, the grouping 1766*a* has smaller widths of transducer elements along the short axis of the elements, enabling higher-frequency acoustic radiation to be output and received by the transducer than for the transducers of the grouping 1766*b*. As will be understood by those skilled in the art, different diamond sizes can facilitate sending and receiving different, respective acoustic frequencies. Both of the groupings 1766*a-b* can be used in a single transducer, thus enabling dual-frequency operation.

Figure 17D:
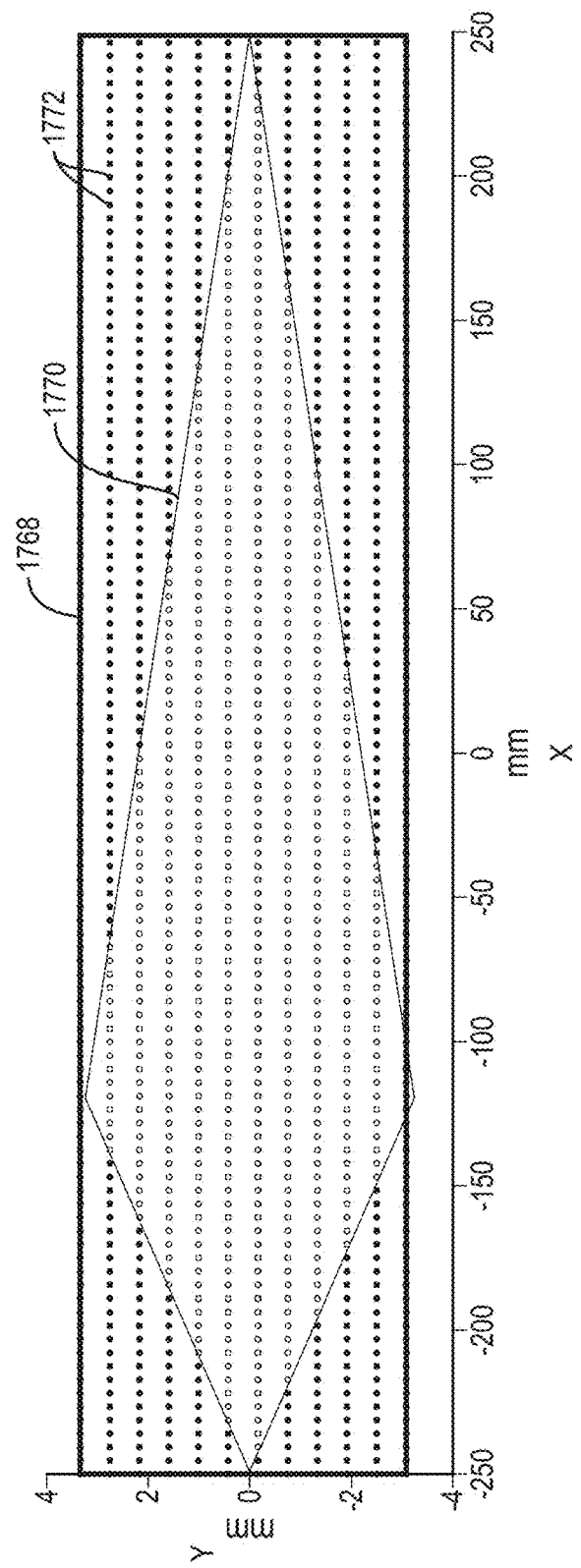
FIG. 17D is a graph illustrating computational points used to model rectangular and skewed diamond transducer shapes to determine the side lobe structure.

FIG. 17D is a graph of dots 1772 used for purposes of modeling Y-direction radiation patterns for transducer elements of rectangular and skewed diamond shapes. In particular, the dots 1772 represent discrete parts (individual, small portions) of respective transducers. It will be noted that the scales X and Y axis scales are very different in FIG. 17D. The Y axis is scaled in FIG. 17D such that the skewed diamond shape can be appreciated more easily.

Radiation patterns were calculated for a rectangular transducer element, as defined by the rectangle outline 1768 in FIG. 17D by using all of the discrete parts represented by dots located within the rectangle 1768. In complementary calculations, the Y-direction radiation distribution for a skewed diamond-shaped transducer element, as defined by the skewed diamond outline 1770 in FIG. 17D, was performed using only the dots 1772 located within the skewed-diamond outline 1770. The results of these calculations are illustrated in FIGS. 17E-F.

Figure 17E:
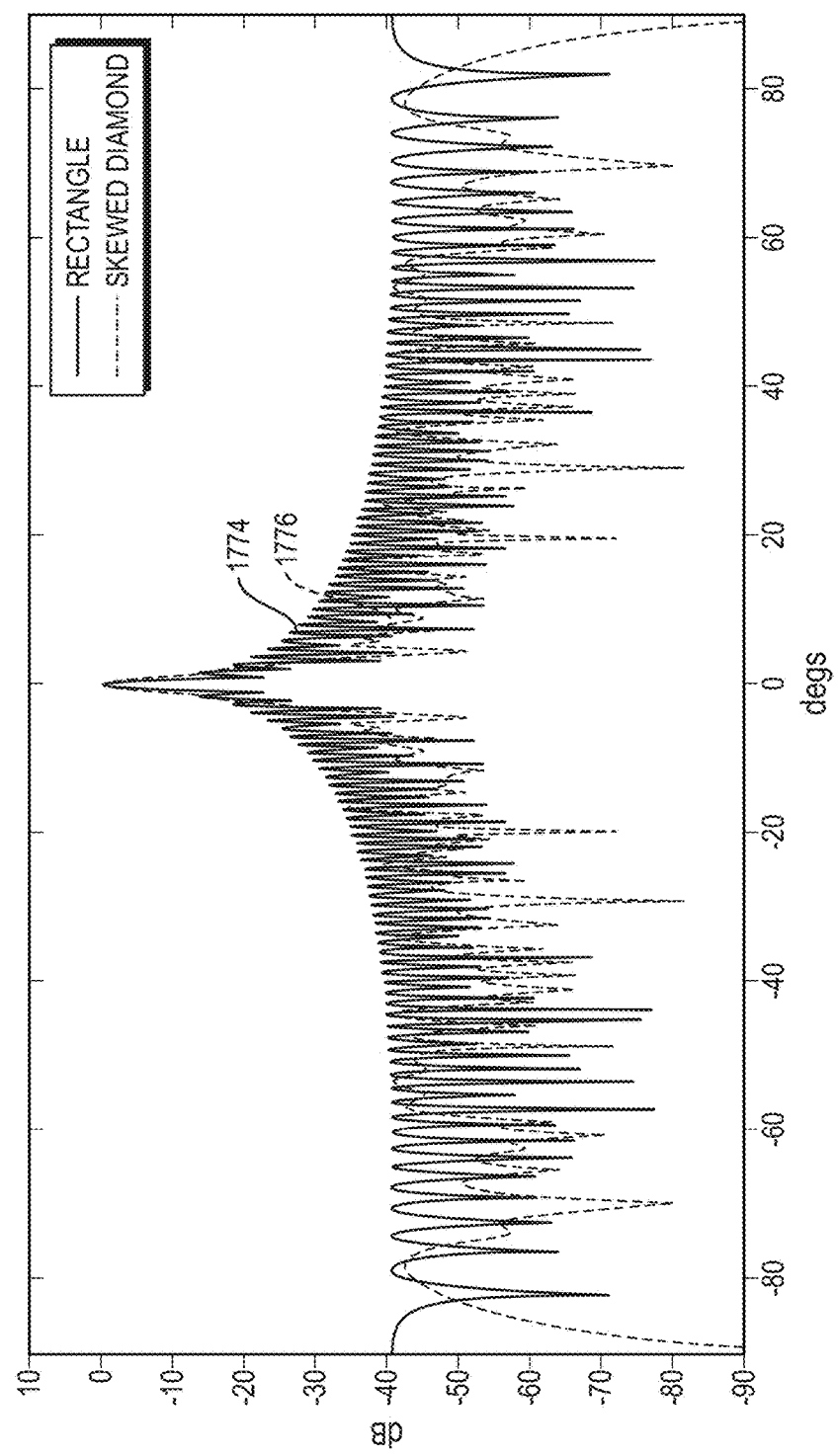
FIG. 17E is a graph illustrating the relative Y axis radiation amplitude distributions for the rectangular and skewed diamond-shaped elements as represented in FIG. 17D.

FIG. 17E is a graph illustrating a Y-direction polar acoustic radiation pattern calculated for both the rectangle transducer shape 1768 and the skewed diamond transducer shape 1770 illustrated in FIG. 17D. In particular, a Y radiation distribution 1774 is illustrated for the rectangle case, compared with a Y radiation distribution 1776 calculated for the skewed diamond shape 1770 in FIG. 17D. As seen in FIG. 17E, side lobes for the skewed diamond distribution 1776 are generally lower than for the rectangular case.

Figure 17F:
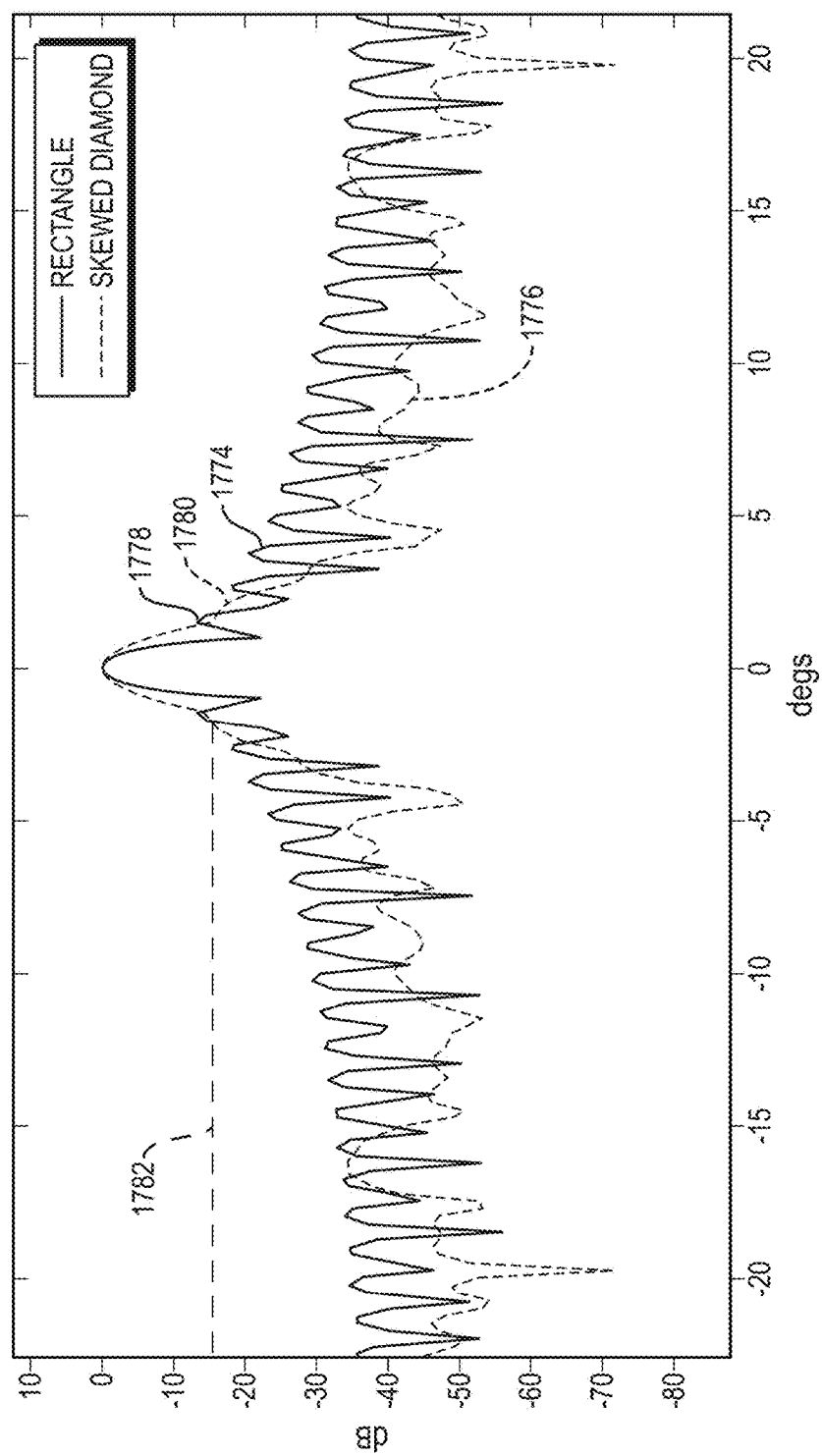
FIG. 17F is a detailed view of the graph in FIG. 17E, showing only the angular range −20°-+20°.

FIG. 17F is a more detailed view of the graph in FIG. 17E, showing only the region between about −20° and +20°. A first side lobe 1778 is shown in the calculated spectrum 1774 for the rectangular transducer shape. FIG. 17F also shows a first side lobe 1784 for the skewed diamond transducer shape.

As seen in FIG. 17F, the strength of the first side lobe 1780 for the skewed diamond case is at a level 1782 of about −16 dB. The strength of this first side lobe for skewed diamond cases varies depending on the degree of skew. In particular, as the lengths of the sides (see, e.g., FIG. 17A) become closer to equal, the strength of the first side lobe advantageously decreases, but the minimum spacing along the short axis illustrated in FIG. 17B increases.

In the extreme case, where the diamond shape becomes equilateral and non-skewed, as illustrated for the element 460 in FIG. 4A, the strength of the first side lobe decreases to about −27 dB, as illustrated in FIG. 4D, which is about the theoretical limit for a diamond aperture. However, as noted hereinabove, for the unilateral diamond shape 460 in FIG. 4A, separation between elements in an interferometric transducer cannot be decreased for the benefits described in connection with FIG. 17B and elsewhere hereinabove. Thus, there can be an engineering tradeoff between the desire for low strength of the first side lobe and the goal of small separation 1766 between the acoustic centers of two skewed diamond transducers, such as those illustrated in FIG. 17B.

While this invention has been particularly shown and described with references to example embodiments thereof, it will be understood by those skilled in the art that various changes in form and details may be made therein without departing from the scope of the invention encompassed by the appended claims.

What is claimed is:

1. An acoustic transducer comprising:
a transducer element with an acoustic radiative surface, the radiative surface including two warped edges at opposing sides of the radiative surface, wherein the warped edges define shapes causing an overall width of the radiative surface to be greater than any local width of the radiative surface, the acoustic radiative surface configured to transmit or receive acoustic radiation along an axis perpendicular to the overall width of the acoustic radiative surface.

2. The transducer of claim 1, wherein the radiative surface further includes two tapered ends, and wherein each warped edge extends from one of the tapered ends to the other.

3. The transducer of claim 1, wherein each of the two warped edges has a truncated Gaussian shape.

4. The transducer of claim 1, wherein the transducer element is a first transducer element, the transducer further comprising a second transducer element, with an acoustic radiative surface, the radiative surface including two warped edges at opposing sides of the radiative surface.

5. The transducer of claim 4, wherein the first and second transducer elements are stacked against each other, the acoustic radiative surface of the first transducer element and the acoustic radiative surface of the second transducer element partially overlapping.

6. The transducer of claim 4, further comprising an electrical circuit configured to drive or receive signals by the first and second transducer elements at the same frequency, the electrical circuit further configured to acquire interferometric sonar data based on signals received by the transducer elements.

7. The transducer of claim 4, wherein each of the first and second transducer elements is divided into at least two spatially separated element portions electrically coupled to each other, the element portions of the first transducer configured to interleave the element portions of the second transducer.

8. The transducer of claim 4, wherein the first and second transducer elements occupy a common surface and overlap each other.

9. The transducer of claim 8, wherein the first transducer element comprises a first plurality of non-contiguous sub-elements electrically coupled to each other, and wherein the second transducer element comprises a second plurality of non-contiguous sub-elements electrically coupled to each other, and wherein the first plurality of sub-elements is electrically isolated from the second plurality of sub-elements.

10. The transducer of claim 1, wherein the transducer element is a PVDF transducer element, and wherein a conductive layer is deposited onto a portion of a PVDF sheet, the portion defining the acoustic radiative surface of the PVDF transducer element.

11. The transducer of claim 1, wherein the transducer element is a ceramic, capacitive, fiber-optic, magnetostrictive, or electrostrictive transducer element.

12. The transducer of claim 1, further including one or more additional transducer elements, each element having a respective acoustic radiative surface including two warped edges at opposing sides of the respective radiative surface.

13. The transducer of claim 1, wherein each of the two warped edges has a periodic shape.

14. The transducer of claim 1, wherein each of the two warped edges is smooth.

15. The transducer of claim 1, wherein each of the two warped edges defines at least one 90° angle therein, the two warped edges further defining a second portion of the transducer element shifted from a first portion of the transducer element in a direction perpendicular to a major axis of the transducer element.

16. The transducer of claim 4, further comprising an electrical drive circuit configured to drive or receive signals by the first and second transducer elements at the same frequency.

17. The transducer of claim 16, wherein the electrical drive circuit is further configured to drive the first and second transducer elements with mutually distinct phases.

18. The transducer of claim 4, further comprising an electrical receive circuit configured to detect a phase difference between acoustic signals intended to be received at the first and second transducer elements.

19. The transducer of claim 4, wherein at least one element portion of the second transducer element is in physical contact with at least one element portion of the first transducer element.

* * * * *